US007454258B2

(12) United States Patent
Nishikori et al.

(10) Patent No.: US 7,454,258 B2
(45) Date of Patent: Nov. 18, 2008

(54) DIGITAL MIXING SYSTEM, ENGINE APPARATUS, CONSOLE APPARATUS, DIGITAL MIXING METHOD, ENGINE APPARATUS CONTROL METHOD, CONSOLE APPARATUS CONTROL METHOD, AND PROGRAMS EXECUTING THESE CONTROL METHODS

(75) Inventors: Taku Nishikori, Hamamatsu (JP); Kotaro Terada, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 64 days.

(21) Appl. No.: 11/268,972

(22) Filed: Nov. 7, 2005

(65) Prior Publication Data

US 2006/0064187 A1 Mar. 23, 2006

Related U.S. Application Data

(62) Division of application No. 10/032,948, filed on Dec. 26, 2001, now Pat. No. 7,242,990.

(30) Foreign Application Priority Data

| | | |
|---|---|---|
| Dec. 26, 2000 | (JP) | 2000-396104 |
| Dec. 26, 2000 | (JP) | 2000-396105 |
| Dec. 26, 2000 | (JP) | 2000-396106 |
| Nov. 27, 2001 | (JP) | 2001-360648 |
| Nov. 27, 2001 | (JP) | 2001-360649 |
| Nov. 27, 2001 | (JP) | 2001-360650 |

(51) Int. Cl.
*G06F 17/00* (2006.01)
*H04B 1/00* (2006.01)

(52) U.S. Cl. ........................................ 700/94; 381/119

(58) Field of Classification Search ................. 381/119, 381/106, 104, 107, 109, 56, 58, 80, 81, 85, 381/123, 177; 700/94; 369/4
See application file for complete search history.

(56) References Cited

U.S. PATENT DOCUMENTS 6,061,458 A * 5/2000 East et al. .................. 381/119

FOREIGN PATENT DOCUMENTS

| | | |
|---|---|---|
| JP | 6022398 | 1/1994 |
| JP | 06-119015 | 4/1994 |
| JP | 06-269100 | 9/1994 |
| JP | 11-317063 | 11/1999 |
| JP | 2000-181719 | 6/2000 |
| JP | 2000-197034 | 7/2000 |
| JP | 2000-217199 | 8/2000 |
| JP | 2000-217200 | 8/2000 |
| JP | 2000-311087 | 11/2000 |

* cited by examiner

*Primary Examiner*—Suhan Ni
*Assistant Examiner*—Andrew C Flanders
(74) *Attorney, Agent, or Firm*—Morrison & Foerster LLP

(57) ABSTRACT

A digital mixing system is provided in which a console section and an engine section that executes signal processing can operate consistently in accordance with control signals input to the console section and the engine section. The digital mixing system has a plurality of input signal systems and a plurality of output signal systems. Input signals from the input signal systems are subjected to a mixing process and the mixed signals are output to the output signal systems. In a console section, panel operating elements are used to input parameters relating to the mixing process, and a first control device generates a mixing control signal in response to operation of the panel operating elements or to a first control signal input via a first input terminal or a first communication interface, and outputs the mixing control signal to the first communication interface. In an engine section, a mixing processing device executes the above mixing process, and a second control device controls the mixing process executed by the mixing processing device in response to the mixing control signal input via a second communication interface and outputs a second control signal input via a second input terminal to the second communication interface. Communication lines connect between the first communication interface and the second communication interface.

8 Claims, 15 Drawing Sheets

DIGITAL MIXING SYSTEM, ENGINE APPARATUS, CONSOLE APPARATUS, DIGITAL MIXING METHOD, ENGINE APPARATUS CONTROL METHOD, CONSOLE APPARATUS CONTROL METHOD, AND PROGRAMS EXECUTING THESE CONTROL METHODS

CROSS REFERENCE TO RELATED APPLICATION

This application is a division of application Ser. No. 10/032,948 filed on Dec. 26, 2001, the entire contents of which is incorporated herein by reference.

BACKGROUND OF THE INVENTION

1. Field of the Invention

The present invention relates to a digital mixing system that has a plurality of input signal systems and a plurality of output signal systems to subject input signals from the plurality of input signal systems to a mixing process and output the mixed input signals to the plurality of output signal systems, as well as an engine apparatus, a console apparatus, a digital mixing method, an engine apparatus control method, a console apparatus control method, and programs executing these control methods.

2. Description of the Related Art

Conventionally, mixing consoles are well known, which adjust the levels and frequency characteristics of audio signals output from a large number of microphones or electric or electronic instruments, mix these signals into several mixing groups, and collectively transmit these mixing groups to a power amplifier. An operator operating the mixing console operates various panel buttons (panel operating elements) provided on the mixing console to adjust the volume and tone of each audio signal for an instrumental sound or a singing voice so that the signal most properly expresses the actual performance. The mixing console is provided with a plurality of microphone/line input channels as input signal systems. The input signal systems are programmed and signals from the input signal systems are subjected to a mixing process, and the mixed input signals are output to a plurality of output channels as output signal systems. In general, signals on the input channels of the input signal systems are amplified by a head amplifier and then output to a mixing processing section. Then, the mixing processing section adjusts the frequency characteristics and levels of the amplified signals on the respective input channels and mixes these signals in a programmed combination. Then, the resulting mixed signals are each set by an output fader to a desired output level and then output to one of the output channels.

Such a mixing console is used in theaters or concert halls or in recording studios to create music sources to be recorded on compact disks (CDs). For example, when the mixing console is used in a concert hall, a large number of microphones are installed on a stage, and instrumental sounds or singing voices are input to the mixing console through the microphones. The mixing console adjusts the levels or frequency characteristics of a large number of input microphone/line signals, mixes these signals in a desired combination, and then outputs the mixed signals to a power amplifier that drives speakers.

Since a large number of microphone/line signals are input to such a mixing console via respective cables, a large number of cables are connected to the mixing console. In a concert hall, the mixing console may be installed in the vicinity of the stage, but, in general, it is installed in an area of seats for the audience, which is remote from the stage, or in a mixer room provided behind the area of seats for the audience, in order to allow the operator to perform a mixing operation while checking sound being listened to by the audience. Thus, long cables are required to input microphone/line signals to the mixing console, and the operation of laying such cables is cumbersome and time-consuming. Furthermore, the longer the cables are extended, the more likely the mixing console is to be affected by noise.

To solve this problem, a mixing system has been proposed, in which an engine section that mixes input microphone/line signals is separated from a console section that controls a mixing process, the engine section and the console section being connected together via communication lines. With this mixing system, the engine section that executes a mixing process can be installed in the vicinity of the stage, while the console section can be installed in the area of audience seats, thereby allowing the operator to control the mixing process while checking sound being listened to by the audience. Moreover, microphone/line signals are input to the engine section that executes the mixing process, thereby making it easier to perform the operation of laying the cables. Further, this system does not require the use of long cables and can thus prevent noise.

However, if the engine and console sections are separated from each other and connected together via the communication lines, then for convenience' sake, each of these sections is provided with input terminals for control signals from external devices. Then, the mixing process is controlled in accordance with control signals input to the engine and console sections. In this case, the system must operate consistently irrespective of whether a control signal is input to the engine section or the console section. Disadvantageously, no method has been established to achieve such a consistent operation.

Further, when the engine and console sections are separated from each other and connected together via the communication lines, if a disconnection occurs in the communication lines for any reason, the entire mixing system may disadvantageously become inoperative even if the engine section is not defective. Furthermore, if a fault occurs in the console section, the entire system may disadvantageously become inoperative even if the communication lines and the engine section are not defective.

Further, the engine and console sections of the mixing system each have arithmetic means for controlling the operation thereof. However, the engine and console sections can be separated from each other and the connection therebetween can be flexibly changed, thereby hindering the collective upgrading of operation software used by the respective arithmetic means.

Moreover, if the engine section that executes a mixing process is installed in the vicinity of the stage, and the console section is installed in the area of audience seats, then the operator controls the mixing process while checking sound being listened to by the audience. In this case, a time delay occurs before sound emitted from stage speakers reaches the operator in the area of audience seats, because of the long distance between the speakers and the operator. On the other hand, the operator carries out a mixing operation by operating panel buttons provided on the console section, and monitors signals resulting from mixing performed in accordance with the mixing operation by the engine section, through monitor speakers or a monitor headphone. However, since sound emitted from the stage speakers reaches the operator with a time delay, a time difference occurs between the sound emitted from the stage speakers and the sound being listened to by the operator through the monitor speakers or monitor headphone. Consequently, it is very difficult for the operator to properly evaluate the mixed signals.

Further, the mixing system is provided with a talk back function for enabling the operator operating the console section to communicate with staff on the stage. For example, when a talk back switch provided on the console section is depressed, a microphone input to the console section is turned on so that the operator's voice sound is emitted from a monitor speaker on the stage. If the stage staff communicates with the operator at the console, he uses any one of analog input channels to the engine section to input his voice so that his voice sound is emitted from the monitor speakers of the console section. However, such communication is impossible unless the operator at the console section has enabled the channel assigned for the communication. Further, monitor sound for use in monitoring sound from the stage speakers is also emitted from the monitor speakers, and the voice sound for communication between the stage staff and the operator may be drowned by the monitor sound. Moreover, one of the input channels must be used for the communication, thereby limiting available resources.

SUMMARY OF THE INVENTION

It is a first object of the present invention to provide a digital mixing system and method in which a console section and an engine section that executes signal processing can operate consistently in accordance with control signals input to the console section and the engine section.

It is a second object of the present invention to provide a digital mixing system, an engine apparatus, a console apparatus, a digital mixing method, an engine apparatus control method, and a console apparatus control method, which, even if a disconnection occurs in the communication lines connecting between the engine section and the console section, enable a mixing process to be performed by controlling the engine section, and even if a fault occurs in the console section, enable a mixing process to be performed by controlling the engine section, and programs for executing the control methods.

It is a third object of the present invention to provide a digital mixing system and method that enables collective upgrading of operation software used by the system comprised of an engine section and a console section connected together via communication lines.

It is a fourth object of the present invention to provide a digital mixing system and method that can prevent a time difference between monitor sound and sound emitted from stage speakers in the system comprised of an engine section and a console section connected together via communication lines.

It is a fifth object of the present invention to provide a digital mixing system and method that enables staff on a stage to communicate with an operator at the console section without requiring the operator's operation, and which can prevent input channel resources from being reduced by execution of a talk back function.

To attain the first object, a first aspect of the present invention provides a digital mixing system having a plurality of input signal systems and a plurality of output signal systems, wherein input signals from the plurality of input signal systems are subjected to a mixing process and the mixed signals are output to the plurality of output signal systems, the system comprising a console section including panel operating elements used to input parameters relating to the mixing process, a first input terminal, a first communication interface, and a first control device that generates a mixing control signal in response to operation of the panel operating elements or to a first control signal input via the first input terminal or the first communication interface, and outputs the mixing control signal to the first communication interface, an engine section including a second input terminal, a second communication interface, a mixing processing device that executes the mixing process of mixing the input signals from the plurality of input signal systems and outputting the mixed signals to the plurality of output signal systems, and a second control device that controls the mixing process executed by the mixing processing device in response to the mixing control signal input via the second communication interface and outputs a second control signal input via the second input terminal to the second communication interface, and communication lines connecting between the first communication interface and the second communication interface.

To attain the first object, the first aspect of the present invention also provides a digital mixing system having a plurality of input signal systems and a plurality of output signal systems, wherein input signals from the plurality of input signal systems are subjected to a mixing process and the mixed signals are output to the plurality of output signal systems, the system comprising a console section including panel operating elements used to input parameters relating to the mixing process, a panel display device that displays contents of the mixing process, a first computer connection terminal, a first communication interface, and a first control device that updates the contents displayed by the panel display device and generates a mixing control signal, in response to operation of the panel operating elements or to a first control signal input via the first computer connection terminal or the first communication interface, and outputs the generated mixing control signal to the first communication interface, an engine section including a second computer connection terminal, a second communication interface, a mixing processing device that executes the mixing process of mixing the input signals from the plurality of input signal systems and outputting the mixed signals to the plurality of output signal systems, and a second control device that controls the mixing process executed by the mixing processing device in response to the mixing control signal input via the second communication interface and outputs a second control signal input via the second computer connection terminal to the second communication interface, and communication lines connecting between the first communication interface and the second communication interface.

In a typical preferred form of the first aspect, a first computer is connected to the first computer connection terminal of the console section, the first computer generating the first control signal input via the first computer connection terminal, and wherein a second computer is connected to the second computer connection terminal of the engine section, the second computer generating the second control signal input via the second computer connection terminal.

Preferably, if a fault occurs in the console section, a computer connected to the first computer connection terminal of the console section generates and outputs the mixing control signal to the first computer connection terminal in place of the console section, and the console section outputs the mixing control signal input via the first computer connection terminal, to the first communication interface.

Also preferably, if a fault occurs in the console section, a computer connected to the first computer connection terminal of the console section generates and outputs the mixing control signal to the second computer connection terminal in place of the console section, and the second control device of the engine section controls the mixing process executed by the mixing processing device in response to the mixing control signal input via the second computer connection terminal.

To attain the first object, the first aspect of the present invention further provides a digital mixing method applied to a digital mixing system comprising a plurality of input signal systems, a plurality of output signal systems, a console section including panel operating elements used to input parameters relating to a mixing process, a first input terminal, and a first communication interface, an engine section including a second input terminal and a second communication interface, and communication lines connecting between the first communication interface and the second communication interface, wherein input signals from the plurality of input signal systems are subjected to the mixing process and the mixed signals are output to the plurality of output signal systems, the method comprising a mixing control signal generating step of causing the console section to generate a mixing control signal in response to operation of the panel operating elements and to a first control signal input via the first input terminal or the first communication interface, a mixing control signal outputting step of causing the console section to output the generated mixing control signal to the first communication interface, a mixing process execution step of causing the engine section to execute the mixing process of mixing the input signals from the plurality of input signal systems and outputting the mixed signals to the plurality of output signal systems, a mixing process control step of causing the engine section to control the mixing process executed by the mixing process execution step in response to the mixing control signal input via the second communication interface, and a second control signal outputting step of causing the engine section to output a second control signal input via the second input terminal, to the second communication interface.

To attain the first object, the first aspect of the present invention further provides a digital mixing method applied to a digital mixing system comprising a plurality of input signal systems, a plurality of output signal systems, a console section including panel operating elements used to input parameters relating to a mixing process, a panel display device that displays contents of the mixing process, a first computer connection terminal, and a first communication interface, an engine section including a second computer connection terminal and a second communication interface, and communication lines connecting between the first communication interface and the second communication interface, wherein input signals from the plurality of input signal systems are subjected to the mixing process and the mixed signals are output to the plurality of output signal systems, the method comprising an updating and generating step of causing the console section to update the contents displayed by the panel display device and generate a mixing control signal in response to operation of the panel operating elements or to a first control signal input via the first computer connection terminal or the first communication interface, a mixing control signal outputting step of causing the console section to output the generated mixing control signal to the first communication interface, a mixing process execution step of causing the engine section to execute the mixing process of mixing the input signals from the plurality of input signal systems and outputting the mixed signals to the plurality of output signal systems, a mixing process control step of causing the engine section to control the mixing process in the mixing process execution step in response to the mixing control signal input via the second communication interface, and a second control signal outputting step of causing the engine section to output a second control signal input via the second computer connection terminal, to the second communication interface.

To attain the second object, a second aspect of the present invention provides a digital mixing system having a plurality of input signal systems and a plurality of output signal systems, wherein input signals from the plurality of input signal systems are subjected to a mixing process and the mixed signals are output to the plurality of output signal systems, the system comprising an engine section including a mixing processing device that executes the mixing process of mixing the input signals from the plurality of input signal systems and outputting the mixed signals to the plurality of output signal systems, and a computer connection interface, and a supply device that is connected to the computer connection interface and supplies a mixing control signal for controlling the mixing process executed by the mixing processing device to the engine section.

To attain the second object, the second aspect of the present invention also provides an engine apparatus constituting a part of a digital mixing system having a plurality of input signal systems and a plurality of output signal systems, wherein input signals from the plurality of input signal systems are subjected to a mixing process and the mixed signals are output to the plurality of output signal systems, the engine apparatus being connected to an external console apparatus via communication lines and comprising a computer connection terminal for connection to an external computer, a communication interface for connection to the external console apparatus via the communication lines, a mixing processing device that executes the mixing process of mixing the input signals from the plurality of input signal systems and outputting the mixed signals to the plurality of output signal systems, an abnormality detecting device that detects whether communication with the external console apparatus via the communication interface is disabled, and a control device that controls the mixing process executed by the mixing processing device in response to a first mixing control signal input via the communication interface if the abnormality detecting device does not detect that the communication is disabled, and controls the mixing process executed by the mixing processing device in response to a second mixing control signal input via the computer connection terminal if the abnormality detecting device detects that the communication is disabled.

Preferably, the external computer connected to the computer connection terminal generates the second mixing control signal input via the communication interface.

To attain the second object, the second aspect of the present invention further provides a console apparatus constituting a part of a digital mixing system having a plurality of input signal systems and a plurality of output signal systems, wherein input signals from the plurality of input signal systems are subjected to a mixing process and the mixed signals are output to the plurality of output signal systems, the engine apparatus being connected to an external engine apparatus via communication lines and comprising a computer connection terminal for connection to an external computer, a communication interface for connection to the external engine apparatus via the communication lines, panel operating elements used to input parameters relating to the mixing process, a panel display device that displays contents of the mixing process, a control device that updates the contents displayed by the panel display device and generates a mixing control signal in response to operation of the panel operating elements, and outputs the generated mixing control signal to the communication interface, an abnormality detecting device that detects whether operation of the control device is abnormal, and an operation switching device that outputs a first signal input via the computer connection terminal, to the communication interface, and outputs a second signal input via the communication interface, to the computer connection terminal, when the abnormality detecting device detects that the operation of the control device is abnormal.

Preferably, the first signal is a mixing control signal that is similar to the mixing control signal generated by the control device, the first signal being generated by the computer connected to the computer connection terminal.

To attain the second object, the second aspect of the present invention further provides a digital mixing method applied to a digital mixing system comprising a plurality of input signal systems, a plurality of output signal systems, an engine section including a computer connection interface, and a computer connected to the computer connection interface, wherein input signals from the plurality of input signal systems are subjected to a mixing process and the mixed signals are output to the plurality of output signal systems, the method comprising a mixing processing step of causing the engine section to execute the mixing process of mixing the input signals from the plurality of input signal systems and outputting the mixed signals to the plurality of output signal systems, and a mixing control signal supplying step of causing the computer to supply a mixing control signal for controlling the mixing process in the mixing processing step to the engine section.

To attain the second object, the second aspect of the present invention further provides a control method for controlling an engine apparatus constituting a part of a digital mixing system comprising a plurality of input signal systems and a plurality of output signal systems, wherein input signals from the plurality of input signal systems are subjected to a mixing process and the mixed signals are output to the plurality of output signal systems, the engine apparatus being connected to an external console apparatus via communication lines and comprising a computer connection terminal for connection to an external computer, and a communication interface for connection to the external console apparatus via the communication lines, the method comprising a mixing processing step of executing the mixing process of mixing the input signals from the plurality of input signal systems and outputting the mixed signals to the plurality of output signal systems, an abnormality detecting step of detecting whether communication with the external console apparatus via the communication interface is disabled, and a mixing process control step of controlling the mixing process in the mixing processing step in response to a first mixing control signal input via the communication interface if it is not detected in the abnormality detecting step that the communication is disabled, and controlling the mixing process in the mixing processing step in response to a second mixing control signal input via the computer connection terminal if it is detected in the abnormality detecting step that the communication is disabled.

To attain the second object, the second aspect of the present invention further provides a control method for controlling a console apparatus constituting a part of a digital mixing system comprising a plurality of input signal systems and a plurality of output signal systems, wherein input signals from the plurality of input signal systems are subjected to a mixing process and the mixed signals are output to the plurality of output signal systems, the console apparatus being connected to an external engine apparatus via communication lines and comprising a computer connection terminal for connection to an external computer, and a communication interface for connection to the external engine apparatus via the communication lines, panel operating elements used to input parameters for the mixing process, and a panel display device that displays contents of the mixing process, the method comprising a control step of updating the contents displayed by the panel display device and generating a mixing control signal, in response to operation of the panel operating elements, an output step of outputting the generated mixing control signal to the communication interface, an abnormality detecting step of detecting whether operation of the control step or the output step is abnormal, and an operation switching step of providing such control as to output a first signal input via the computer connection terminal, to the communication interface and output a second signal input via the communication interface, to the computer connection terminal, when it is detected in the abnormality detecting step that the operation is abnormal.

To attain the third object, a third aspect of the present invention provides a digital mixing system having a plurality of input signal systems and a plurality of output signal systems, wherein input signals from the plurality of input signal systems are subjected to a mixing process and the mixed signals are output to the plurality of output signal systems, the system comprising a console section including panel operating elements used to input parameters relating to the mixing process, a computer connection interface, a first communication interface, an output device that outputs at least a mixing control signal in response to operation of the panel operating elements, and a first non-volatile memory that stores a first operation program, an engine section including a mixing processing device that executes the mixing process of mixing the input signals from the plurality of input signal systems based on the mixing control signal output from the output device and outputting the mixed signals to the plurality of output signal system, a second communication interface, and a second non-volatile memory that stores a second operation program, and communication lines connecting between the first communication interface and the second communication interface, wherein when a computer connected to the computer connection interface executes an upgrading program, the first operation program stored in the first non-volatile memory and the second operation program stored in the second non-volatile memory are upgraded.

Preferably, at least one input unit that inputs input signals from the plurality of input signal systems and at least one output unit that outputs output signals from the plurality of output signal systems are connected to the engine section, and wherein when the computer executes the upgrading program, a third operation program stored in the input unit and a fourth program stored in the output unit are upgraded.

Preferably, when the computer executes the upgrading program, versions of the first operation program stored in the first non-volatile memory and the second operation program stored in the second non-volatile memory are determined, it is then determined whether each of the first and second operation programs is to be upgraded, and only at least one of the operation programs that is determined to be upgraded is upgraded.

To attain the third object, the third aspect of the present invention also provides a digital mixing system having a plurality of input signal systems and a plurality of output signal systems, wherein input signals from the plurality of input signal systems are subjected to a mixing process and the mixed signals are output to the plurality of output signal systems, the system comprising a console section including panel operating elements used to input parameters relating to the mixing process, a first communication interface, an output device that outputs a mixing control signal at least in response to operation of the panel operating elements, and a first non-volatile memory that stores a first operation program, an engine section including a mixing processing device that executes the mixing process of mixing input signals from the plurality of input signal systems based on the mixing control signal output from the output device and outputting the mixed signals to the plurality of output signal system, a computer connection interface, a second communication interface, and a second non-volatile memory that stores a second operation program, and communication lines connecting between the first communication interface and the second communication interface, wherein when a computer connected to the computer connection interface executes an upgrading program, the first operation program stored in the first non-volatile memory and the second operation program stored in the second non-volatile memory are upgraded.

Preferably, at least one input unit that inputs input signals from the plurality of input signal systems and at least one output unit that outputs output signals from the plurality of output signal systems are connected to the engine section, and wherein when the computer executes the upgrading program, a third operation program stored in the input unit and a fourth program stored in the output unit are upgraded.

Preferably, when the computer executes the upgrading program, versions of the first operation program stored in the first non-volatile memory and the second operation program stored in the second non-volatile memory are determined, it is then determined whether each of the first and second operation programs is to be upgraded, and only at least one of the operation programs that is determined to be upgraded is upgraded.

To attain the third object, the third aspect of the present invention further provides a digital mixing system having a plurality of input signal systems and a plurality of output signal systems, wherein input signals from the plurality of input signal systems are subjected to a mixing process and the mixed signals are output to the plurality of output signal systems, the system comprising a console section including panel operating elements used to input parameters relating to the mixing process, and a first control device that provides such control as to output a mixing control signal in response to operation of the panel operating elements, an engine section connected to the console section and including a mixing processing device that executes the mixing process of mixing the input signals from the plurality of input signal systems and outputting the mixed signals to the plurality of output signal systems, and a second control device that controls the mixing process based on the mixing control signal output from the first control device, at least one input unit connected to the engine section and including an input device that inputs the input signals from a first external device and outputs the input signals to the engine section, and a third control device that controls the input device based on the mixing control signal input from the console section via the engine section, and at least one output unit connected to the engine section and including an output device that inputs output signals from the engine section and outputs the output signals to a second external device, and a fourth control device that controls the output device based on the mixing control signal input from the console section via the engine section, wherein a computer is connected to the console section or the engine section, and the computer executes an upgrading program to collectively upgrade a plurality of operation software for controlling respective ones of the first control device of the console section, the second control device of the engine section, the third control device of the input unit, and the fourth control device of the output unit.

Preferably, the upgrading program comprises a detection step of detecting versions of the operation software for controlling respective ones of the first control device of the console section, the second control device of the engine section, the third control device of the input unit, and the fourth control device of the output unit, a comparison step of comparing versions of upgrading software constituting the upgrading program and for upgrading the operation software for the first to fourth control devices with the detected versions of the operation software for the first to fourth control devices, a transmission step of transmitting the upgrading software to at least one of the first to fourth control devices for which it is determined in the comparison step that a corresponding one of the upgrading software is newer than a corresponding one of the operation software, and an upgrading step of upgrading the operation software for the at least one of the first to fourth control devices to which the upgrading software has been transmitted, using the transmitted upgrading software.

To attain the third object, the third aspect of the present invention further provides a computer program that can be executed on a computer that can be connected to at least one of a console section and an engine section constituting a digital mixing system having a plurality of input signal systems and a plurality of output signal systems, the console section and the engine section being connected together via communication lines, the console section supplying the engine section with a mixing control signal generated based on operation of a user, the engine section mixing input signals from the plurality of input signal systems based on the supplied mixing control signal and outputting the mixed signals to the plurality of output signal systems, the computer program comprising a detection step of detecting versions of first operation software stored in a first storage device in the console section and executed by a first processor in the console section and second operation software stored in a second storage device in the engine section and executed by a second processor in the engine section, a comparison step of comparing a version of first upgrading software for upgrading the first operation software with the detected version of the first operation software, and comparing a version of second upgrading software for upgrading the second operation software with the detected version of the second operation software, a first transmission step of transmitting the first upgrading software to the console section if it is determined in the comparison step that the first upgrading software is newer than the first operation software, whereby the transmitted first upgrading software upgrades the first operation software stored in the first storage device in the console section, and a second transmission step of transmitting the second upgrading software to the engine section if it is determined in the comparison step that the second upgrading software is newer than the second operation software, whereby the transmitted second upgrading software upgrades the second operation software stored in the second storage device in the engine section.

To attain the third object, the third aspect of the present invention further provides a digital mixing method applied to a digital mixing system comprising a plurality of input signal systems and a plurality of output signal systems, wherein input signals from the plurality of input signal systems are subjected to a mixing process and the mixed signals are output to the plurality of output signal systems, a console section including panel operating elements used to input parameters relating to the mixing process, a computer connection interface, a first communication interface, an output device that outputs a mixing control signal at least in response to operation of the panel operating elements, and a first non-volatile memory that stores a first operation program, an engine section including a mixing processing device that executes the mixing process of mixing the input signals from the plurality of input signal systems based on the mixing control signal output from the output device and outputting the mixed signals to the plurality of output signal systems, a second communication interface, and a second non-volatile memory that stores a second operation program, and communication lines connecting between the first communication interface and the second communication interface, the method comprising an upgrading program execution step of causing a computer connected to the computer connection interface to execute an upgrading program, and an upgrading step of upgrading the first operation program stored in the first non-volatile memory and the second operation program stored in the second non-volatile memory.

To attain the third object, the third aspect of the present invention further provides a digital mixing method applied to a digital mixing system comprising a plurality of input signal systems and a plurality of output signal systems, wherein input signals from the plurality of input signal systems are subjected to a mixing process and the mixed signals are output to the plurality of output signal systems, a console section including panel operating elements used to input parameters relating to the mixing process, a first communication interface, an output device that outputs a mixing control signal at least in response to operation of the panel operating elements, and a first non-volatile memory that stores a first operation program, an engine section including a mixing processing device that executes the mixing process of mixing the input signals from the plurality of input signal systems based on the mixing control signal output from the output device and outputting the mixed signals to the plurality of output signal systems, a computer connection interface, a second communication interface, and a second non-volatile memory that stores a second operation program, and communication lines connecting between the first communication interface and the second communication interface, the method comprising an upgrading program execution step of causing a computer connected to the computer connection interface to execute an upgrading program, and an upgrading step of upgrading the first operation program stored in the first non-volatile memory and the second operation program stored in the second non-volatile memory.

To attain the third object, the third aspect of the present invention further provides a digital mixing method applied to a digital mixing system comprising a plurality of input signal systems and a plurality of output signal systems, wherein input signals from the plurality of input signal systems are subjected to a mixing process and the mixed signals are output to the plurality of output signal systems, a console section including panel operating elements used to input parameters relating to the mixing process, and a first control device that provides such control as to output a mixing control signal in response to operation of the panel operating elements, an engine section connected the console section and including a mixing processing device that executes the mixing process of mixing the input signals from the plurality of input signal systems based on the mixing control signal output from the output device and outputting the mixed signals to the plurality of output signal system, and a second control device that controls the mixing process based on the mixing control signal output from the first control device, at least one input unit connected to the engine section and including an input device that inputs the input signals from a first external device and outputs the input signals to the engine section, and a third control device that controls the input device based on the mixing control signal input from the console section via the engine section, and at least one output unit connected to the engine section and including an output device that inputs output signals output from the engine section and outputs the output signals to a second external device, and a fourth control device that controls the output device based on the mixing control signal input from the console section via the engine section, the method comprising an upgrading program execution step of connecting a computer to the console section or the engine section and causing the computer to execute an upgrading program, and an upgrading step of collectively upgrading a plurality of operation software for controlling respective ones of the first control device of the console section, the second control device of the engine section, the third control device of the input unit, and the fourth control device of the output unit.

To attain the fourth object, a fourth aspect of the present invention provides a digital mixing system having a plurality of input signal systems and a plurality of output signal systems, wherein input signals from the plurality of input signal systems are subjected to a mixing process and the mixed signals are output to the plurality of output signal systems, the system comprising a console section including panel operating elements used to input parameters relating to the mixing process, and a first control device that outputs a mixing control signal in response to operation of the panel operating elements, and an engine section connected to the console section and including a mixing processing device that executes the mixing process of mixing the input signals from the plurality of input signal systems and outputting the mixed signals to the plurality of output signal system as mixing signals and a monitor process of selectively outputting the signals being mixed by the mixing process, as monitor signals, and a second control device that controls the mixing process and the monitor process based on the mixing control signal output from the first control device, wherein at least part of the mixing signals are reproduced by at least one stage speaker arranged close to the engine section, and the monitor signals are reproduced by at least one monitor speaker arranged close to the console section, and wherein the panel operating elements of the console section include at least one operating element used to control a delay time for the monitor signals.

To attain the fourth object, the fourth aspect of the present invention also provides a digital mixing method applied to a digital mixing system comprising a plurality of input signal systems and a plurality of output signal systems, a console section including panel operating elements used to input parameters relating to a mixing process, and an engine section connected to the console section, wherein input signals from the plurality of input signal systems are subjected to the mixing process and the mixed signals are output to the plurality of output signal systems, the method comprising a first control step of causing the console section to output a mixing control signal in response to operation of the panel operating elements, a mixing processing step of causing the engine section to mix the input signals from the plurality of input signal systems and outputting the mixed signals to the plurality of output signal system as mixing signals, at least part of the mixing signals being reproduced by at least one stage speaker arranged close to the engine section, a monitor processing step of causing the engine section to execute a monitor process of selectively outputting the signals being mixed by the mixing process, as monitor signals, the monitor signals being reproduced by at least one monitor speaker arranged close to the console section, a second control step of causing the engine section to control the mixing processing step and the monitor processing step based on the mixing control signal output from the first control step, and a delay time control step of causing the console section to cause a delay time for the monitor signals using a part of the panel operating elements.

To attain the fifth object, a fifth aspect of the present invention provides a digital mixing system having a plurality of input signal systems and a plurality of output signal systems, wherein input signals from the plurality of input signal systems are subjected to a mixing process and the mixed signals are output to the plurality of output signal systems, the system comprising a console section including panel operating elements used to input parameters relating to the mixing process, and a first control device that outputs a mixing control signal in response to operation of the panel operating elements, and an engine section connected to the console section and including a processing device that executes the mixing process of mixing the input signals from the plurality of input signal systems and outputting the mixed signals to the plurality of output signal system as mixing signals and a monitor process of selecting at least one of the signals being mixed by the mixing process and outputting the selected signal as a first monitor signal, and a second control device that controls the mixing process and the monitor process, wherein at least part of the mixing signals are reproduced by at least one stage speaker arranged close to the engine section, and the first monitor signal is reproduced by at least one monitor speaker arranged close to the console section, and wherein the engine section further comprises a communication signal system to which a voice signal close to the engine section is input, and wherein the monitor process executed by the processing device of the engine section comprises reducing a level of the first monitor signal if a level of the voice signal input to the communication signal system exceeds a predetermined value, mixing the first monitor signal and the voice signal input to the communication signal system, and outputting the mixed signal as a second monitor signal.

To attain the fifth object, the fifth aspect of the present invention also provides a digital mixing method applied to a digital mixing system comprising a plurality of input signal systems and a plurality of output signal systems, a console section including panel operating elements used to input parameters relating to a mixing process, and an engine section connected to the console section, wherein input signals from the plurality of input signal systems are subjected to the mixing process and the mixed signals are output to the plurality of output signal systems, the method comprising a first control step of causing the console section to output a mixing control signal in response to operation of the panel operating elements, a mixing processing step of causing the engine section to mix the input signals from the plurality of input signal systems and outputting the mixed signals to the plurality of output signal system as mixing signals, at least part of the mixing signals being reproduced by at least one stage speaker arranged close to the engine section, a monitor processing step of causing the engine section to select at least one of the signals being mixed by the mixing process, and output the selected signal as a first monitor signal, the first monitor signal being reproduced by at least one monitor speaker arranged close to the console section, a second control step of causing the engine section to control the mixing processing step and the monitor processing step based on the mixing control signal output in the first control step, a communication signal input step of causing the engine section to input a voice signal in a vicinity of the engine section, a signal output step of causing the engine section to reduce a level of the first monitor signal, mix the first monitor signal and the voice signal input in the communication signal input step and output the mixed signal as a second monitor signal, when a level of the voice signal input in the communication signal input step exceeds a predetermined value.

The above and other objects, features, and advantages of the present invention will be more apparent from the following detailed description taken in conjunction with the accompanying drawings.

DETAILED DESCRIPTION OF THE PREFERRED EMBODIMENTS

The present invention will be described in detail below with reference to the drawings showing an embodiment thereof.

Figure 1:
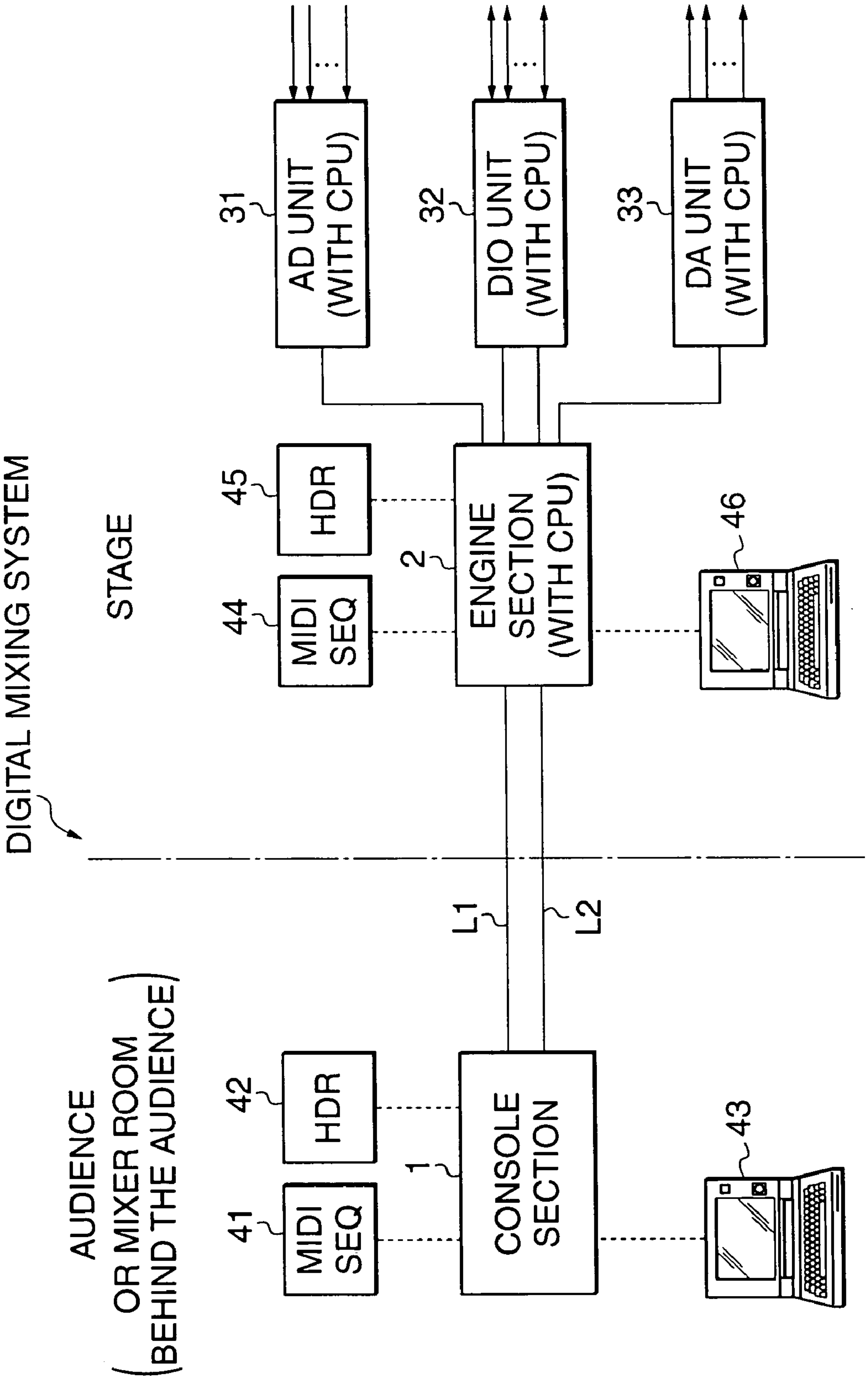
FIG. 1 is a block diagram schematically showing the construction of a digital mixing system according to an embodiment of the present invention installed in a concert hall.
Figure 2:
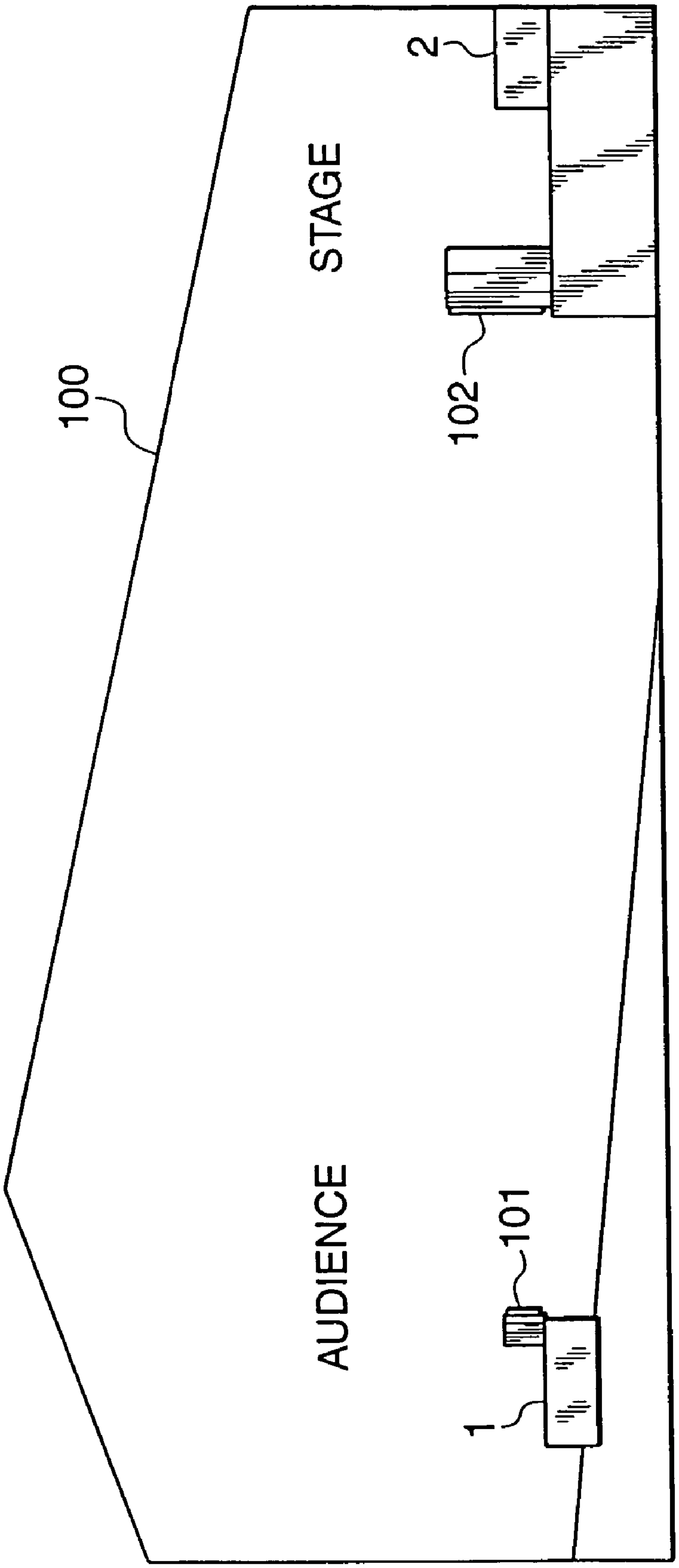
FIG. 2 is a view showing how the digital mixing system according to the embodiment is installed in the concert hall.

FIGS. 1 and 2 schematically show the construction of a digital mixing system according to an embodiment of the present invention installed in a concert hall.

As shown in FIGS. 1 and 2, the digital mixing system according to the present embodiment is separated into a console section 1 and an engine section 2. The console section 1 is installed in an area of seats for the audience or in a mixer room located behind the area of audience seats so that an operator at the console section 1 can use faders and buttons on a console panel to perform a mixing operation while listening to sound being listened to by the audience. The engine section 2 is installed on a stage or in the vicinity thereof so that laying of input/output cables can be easily carried out. Connected to the engine section 2 are a plurality of units 31, 32, and 33 that input and output analog and digital audio signals. Specifically, these units include an analog signal input AD unit 31 that converts analog input signals into digital signals and supplies the digital signals to the engine section 2, a DIO unit 32 that inputs and outputs digital audio signals, and an analog signal output DA unit 33 that converts digital audio signals output from the engine section 2 into analog audio signals and then outputs the analog audio signals.

Further, the console section 1 and the engine section 2, which are arranged separately, are connected with each other via two communication lines L1 and L2. Digital audio signals and mixing control signals are transmitted between the console section 1 and the engine section 2 via the communication lines L1 and L2. Serial transmissions are carried out between the console section 1 and the engine section 2, according to a serial interface standard such as the RS-422, Ethernet, IEEE 1394, or USB (Universal Serial Bus).

In the digital mixing system according to the present embodiment in which the console section 1 and the engine section 2 are separated from each other, analog audio signals input from a microphone/line are converted into digital audio signals by the AD unit 31, and these digital audio signals are then input to the engine section 2. Furthermore, digital audio signals input to the DIO unit 32 are input to the engine section 2 as they are. The operator operating the digital mixing system is located at the console section 1, and performs a mixing operation by operating various panel buttons provided on the console section 1 to adjust the volume and tone color of audio signals for instrumental sounds and singing voices so that sound most properly expressing the actual performance can be obtained. The mixing operation includes adjustment of the frequency characteristics of audio signals on a plurality of input channels which are output to a mixing bus and the level of output to the mixing bus, programming of input channels for signals to be mixed on the mixing bus, adjustment of the frequency characteristics and output level of audio signals on output channels which are output from the mixing bus, and the like.

Operation of selected one or more of a large number of panel buttons provided on the console section 1 causes a mixing control signal corresponding to this mixing operation to be transmitted from the console section 1 and supplied to the engine section 2 via the communication line L1. The engine section 2 executes a mixing process based on the mixing control signal, and the mixed digital audio signals are converted into analog audio signals by the DA unit 33 before being output. Alternatively, the mixed digital audio signals are output from the DIO unit 32 as digital audio signals. The output analog audio signals are transmitted to a power amplifier, not shown, and then emitted from stage speakers 102.

The console section 1 is provided with monitor speakers 101 so that the operator can perform a mixing operation while listening to monitor sound from the monitor speakers 101. In this case, sounds which are being mixed can be monitored by selecting sounds output from the mixing bus or sounds from the output channels.

In the digital mixing system of the present embodiment constructed as described above, the AD unit 31 can accommodate up to eight cards comprised of AD cards each internally having a 4-channel analog digital converter (AD) or MAD cards each internally having a 2-channel head amplifier (an amplifier for microphones) and an analog digital converter (AD). The AD unit 31 corresponds to microphone/line (analog) inputs on up to 32 channels. The AD unit 31 also internally has a CPU (Central Processing Unit). Further, the DIO unit 32 can accommodate up to eight digital I/O cards each having eight inputs and eight outputs and corresponds to digital inputs and outputs on 64 channels. The DIO unit 32 also internally has a CPU. Furthermore, the DA unit 33 can accommodate up to eight DA cards each having a 4-channel digital analog converter (DA) and corresponds to analog outputs on up to 32 channels. The DA unit 33 also internally has a CPU.

The engine section 2 can receive digital inputs through, for example, up to 320 channels, and can have a total of up to ten units of AD units 31 and DIO units 32 connected thereto (however, one unit deals with 32 channels. One DIO unit 32 has two connection lines and thus corresponds to two units). Further, the engine section 2 can provide digital outputs through up to 192 channels, and can have a total of up to six units of DA units 33 and DIO units 32 connected thereto (however, one unit deals with 32 channels. One DIO unit 32 has two connection lines and thus corresponds to two units). However, the digital mixing system of the present invention is not limited to the above numerical values, and allows the use of various numbers of inputs and outputs.

Further, the console section 1 installed in the area of audience seats can be supplied with a MIDI signal from a MIDI sequencer (MIDISEQ) 41 connected to a control signal input terminal thereof so that a mixing operation can be controlled based on a MIDI message received via the control signal input terminal. For example, when a program change message from the MIDI sequencer 41 is received via the control signal input terminal, a scene corresponding to a program number in the message is read out from a scene memory. Then, the console section 1 automatically performs a mixing operation corresponding to this scene. The term "scene" refers to the contents of a mixing operation suitable for that scene, and the scene memory can store preset scenes and user scenes set by a user. Further, when a note on message is supplied via the control signal input terminal by the MIDI sequencer 41, a fader for a channel designated according to a velocity in the note on message is moved to control the level of a digital audio signal on this channel.

Furthermore, the console section 1 is supplied via a time code terminal thereof with a time code from a hard disk recorder (HDR) 42. The console section 1 can perform a mixing operation based on mixing data read out from the HDR 42, synchronously with the time code. In this case, mixing control data based on the mixing operation is transmitted to the engine section 2, which then executes a mixing process. Thus, the digital mixing system can cause a mixing process to be automatically executed based on the mixing data read out from the HDR 42.

Moreover, the console section 1 is provided with a computer connection interface to which a computer 43 can be connected. The console section 1 can be remotely controlled by the computer 43 executing a mixing control program.

Connected to the control signal input terminal of the engine section 2 installed on the stage or in the vicinity thereof is a MIDI sequencer (MIDISEQ) 44. A MIDI signal from the MIDI sequencer 44 is transferred to the console section 1 via the communication line L1 as a control signal. Thus, when a program change message from the MIDI sequencer 44 is supplied via the control signal input terminal to the engine section 2, the console section 1 reads out a scene corresponding to a program number in the message from the scene memory. Then, the console section 1 performs a mixing operation corresponding to this scene. Further, when a note on message is supplied from the MIDI sequencer 44 to the engine section 2 via the control signal input terminal thereof, the console section 1 moves a fader for a channel designated according to a velocity in the note on message to control the level of a digital audio signal on this channel.

In this way, irrespective of whether a MIDI signal is input to the control signal input terminal provided in the console section 1 or the engine section 2, a mixing operation based on the MIDI signal is performed by the console section 1. As a result, a mixing process can be consistently controlled whichever control signal input terminal is used.

Furthermore, the engine section 2 is supplied via a time code terminal thereof with a time code from an HDR 45, and this time code is transferred to the console section 1. Then, the console performs a mixing operation based on mixing data (a stream of operation event data for the console section 1 which is provided with time stamps) read out from the HDR 45, synchronously with the time code. That is, the digital mixing system can cause a mixing process to be automatically executed based on the mixing data read out from the HDR 45. Accordingly, a mixing process can be consistently controlled irrespective of whether a time code is supplied by the HDR 42 or the HDR 45.

Moreover, the engine section 1 is also provided with a computer connection interface to which a computer 46 can be connected. The mixing process executed by the engine section 2 can be controlled by the computer 46 executing a mixing control program.

As described above, the console section 1 and the engine section 2 are each provided with the computer connection interface to which the corresponding computer can be connected. Accordingly, if the communication line L1 or L2 is disconnected for any reason to hinder the console section 1 from normally controlling the engine section 2, then the computer 46 can be connected to the computer connection interface provided in the engine section 2 and the computer 46 can be caused to execute the mixing control program, whereby the computer 46 can act as a master to control a mixing process executed by the engine section 2. In this case, a display section of the computer 46 displays a screen for a console panel having a large number of panel buttons arranged thereon. Then, by selectively operating the panel buttons on the screen and operating a mouse or the like, a mixing operation can be performed in a manner similar to that carried out if the actual corresponding panel buttons are operated.

Further, if any fault occurs in the console section 1 to hinder the console section 1 from normally controlling the engine section 2, then by connecting the computer 43 to the computer connection interface provided in the console section 1 and causing the computer 43 to execute the mixing control program, the computer 43 can act as a master to control a mixing process executed by the engine section 2. Also in this case, a display section of the computer 43 displays a screen for the console panel having the large number of panel buttons arranged thereon. Then, by selectively operating the panel buttons on the screen and operating a mouse or the like, a mixing operation can be performed in a manner similar to that carried out if the actual corresponding buttons are operated. Since the computer 43 can be connected to the console section 1, even if a fault occurs in the console section 1, the operator can operate the computer 43 to perform a mixing operation while listening to sound being listened to by the audience, at the console section.

Figure 3:
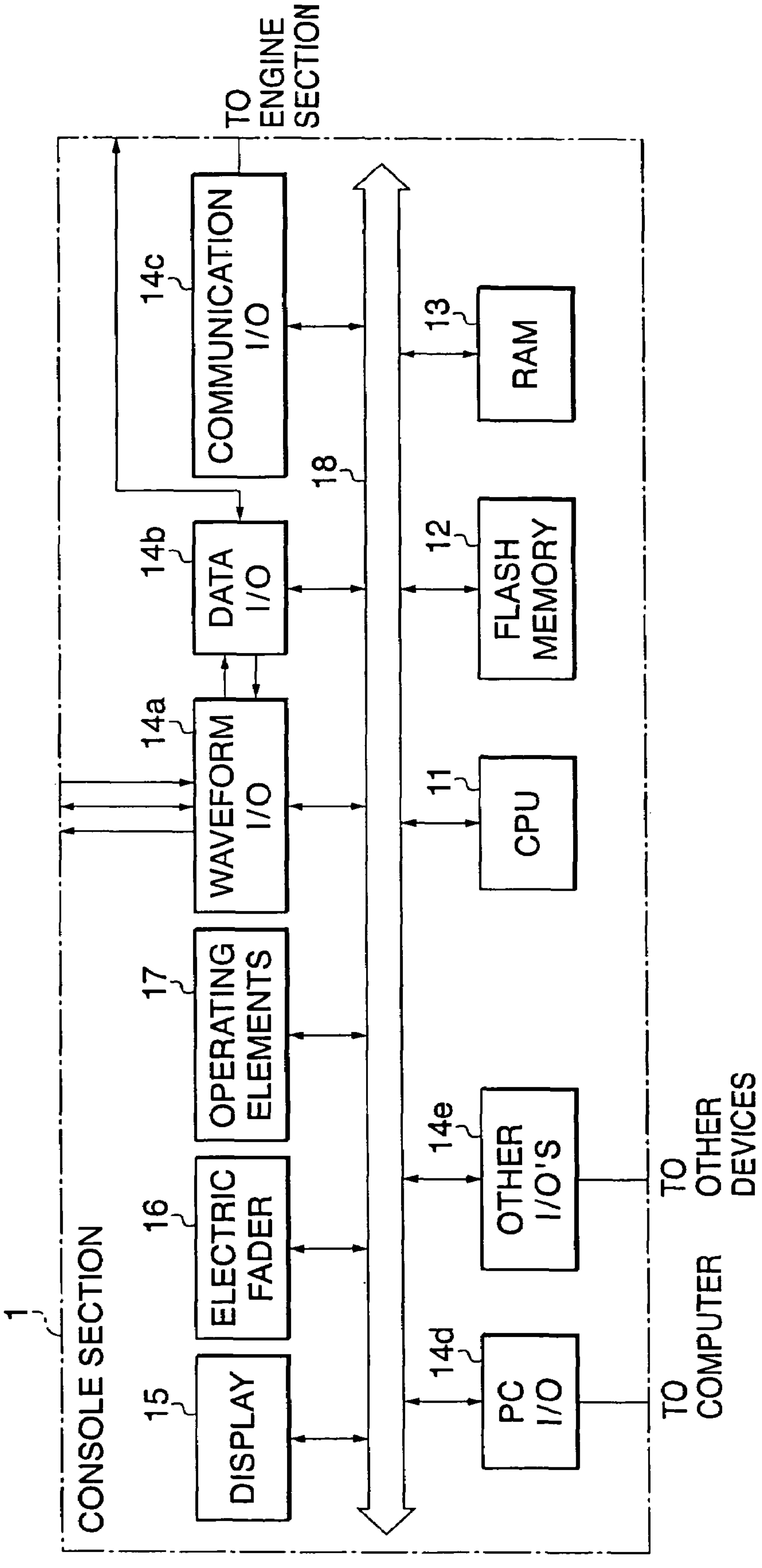
FIG. 3 is a block diagram showing the construction of a console section of the digital mixing system.

FIG. 3 is a block diagram showing the construction of the console section 1.

As shown in FIG. 3, the console section 1 is comprised of a CPU 11 that controls the operation of the entire console section 1 and generates a mixing control signal according to a mixing operation, a rewritable non-volatile flash memory 12 in which operation software such as the mixing control program executed by the CPU 11 is stored, and a RAM (Random Access Memory) 13 in which work areas for the CPU 11 and various data are stored. Since the flash memory 12 thus stores the operation software for the console section, the operation software can be upgraded by merely rewriting the flash memory 12. The console section 1 is further comprised of a computer connection interface (PC I/O) 14*d* to which the computer 43 can be connected, other interfaces 14*e* (other I/Os) as interfaces for the control signal input terminal and the time code terminal, a waveform data interface (waveform I/O) 14*a* that inputs and outputs analog audio signals and digital audio signals, a data interface (data I/O) 14*b* that inputs and outputs digital audio signals from and to the communication line L2 to which digital audio signals are transmitted, and a communication interface (communication I/O) 14*c* that transmits a mixing control signal generated by the CPU 11 to the communication line L1 and receives via the communication line L1 control signals from the MIDI sequencer 44 and the like which are transmitted from the engine section 2.

The analog audio signals input to the waveform data interface 14*a* include stereo analog signals and a talk back signal as a voice signal transmitted from the operator to staff on the stage for communication. These signals are converted into digital signals by the waveform data interface 14*a*. Further, the analog audio signals output from the waveform data interface 14*a* include a cue signal that is issued if any cue switch provided for input and output modules is operated, to output a sound corresponding to that module, and a monitor signal. Such a cue or monitor signal is supplied to the waveform data interface 14*a* by the data interface 14*b* as a digital signal. The waveform data interface 14 then converts this digital signal into an analog signal and outputs the analog signal. Furthermore, the digital audio signals input to the waveform data interface 14*a* correspond to digital sources reproduced by a CD player and a DAT (Digital Audio Tape). Moreover, the digital audio signals output from the waveform data interface 14*a* are stereo digital signals that can be digitally recorded on the DAT and the like.

The data interface 14*b* transmits the talk back signal and digital audio signals for digital sources supplied by the waveform data interface 14*a*, to the communication line L2, and supplies a digital audio signal received from the communication line L2, to the waveform data interface 14*a*. The digital audio signal received from the communication line L2 is a cue or monitor signal, and the monitor signal may be a talk back signal used by the staff to communicate with the operator.

In FIG. 3, reference numeral 15 denotes a liquid crystal display which can show the level of a digital signal obtained in each mixing step, in the form of a bar graph, and can automatically switch the screen based on parameters changed by operating the panel buttons 17. Further, an electric fader 16 adjusts the level of a signal transmitted to the mixing bus and the output level of a mixed signal, and these adjustments can be carried out manually or electrically. The electric adjustment is carried out if the level is to be set based on a read-out scene or a velocity in a MIDI message. In this case, the electric fader 16 is driven based on the level to be set, to thereby automatically move a corresponding dial to set the level. The large number of panel buttons 17 are used to regulate the equalizing and pan characteristics of each signal and to switch the scene. A bus 18 is a common path through which data is transmitted between blocks.

Figure 4:
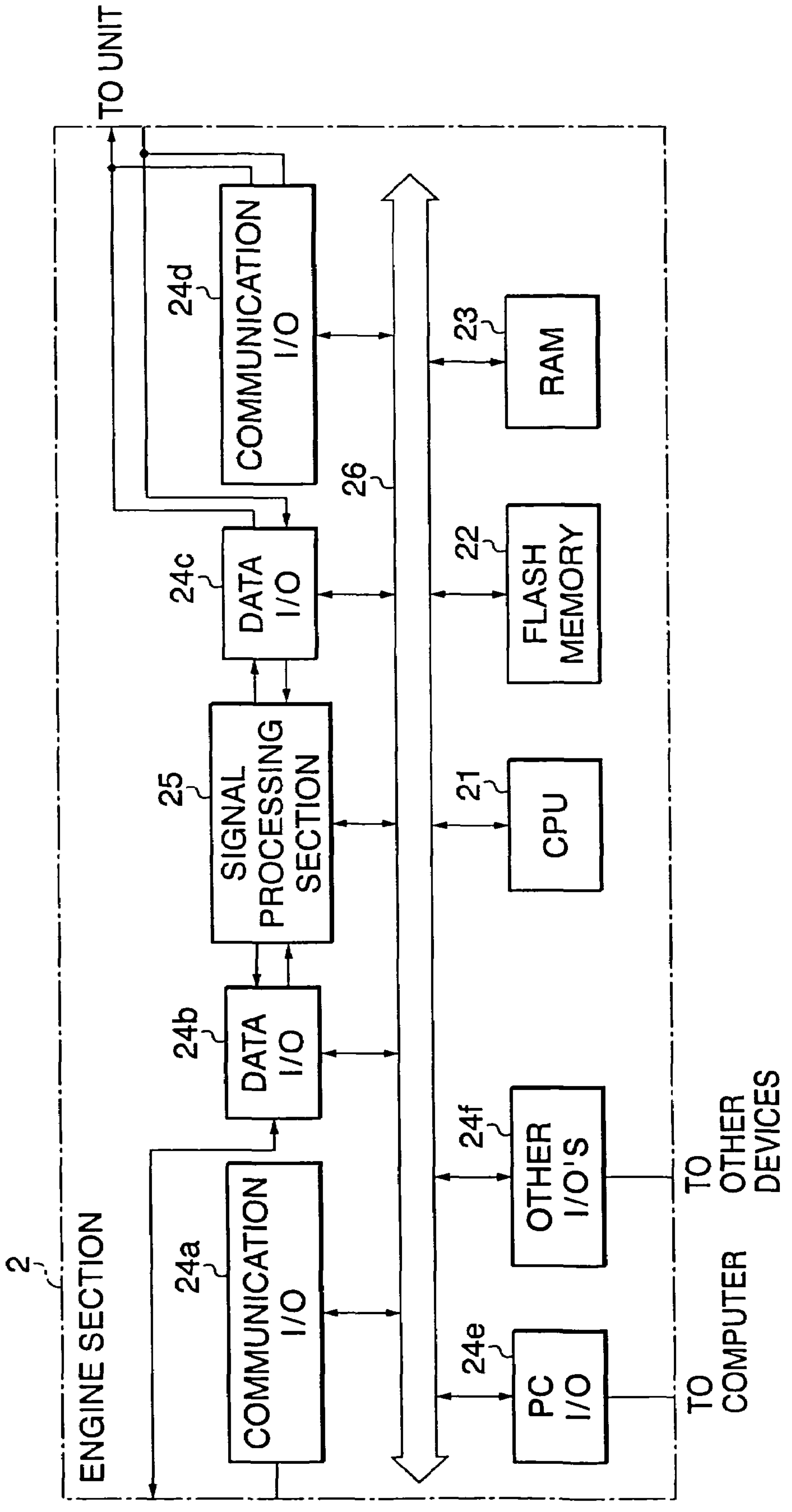
FIG. 4 is a block diagram showing the construction of an engine section of the digital mixing system.

FIG. 4 is a block diagram showing the construction of the engine section 2.

As shown in FIG. 4, the engine section 2 is comprised of a CPU 21 that controls a mixing process executed by the engine section 2 based on a mixing control signal supplied from the console section 1, a rewritable non-volatile flash memory 22 in which operation software such as the mixing control program executed by the CPU 21 is stored, and a RAM 23 in which work areas for the CPU 21 and various data are stored. Since the flash memory 22 thus stores the operation software for the engine section, the operation software can be upgraded by merely rewriting the flash memory 22. Further, a signal processing section 25 is comprised of a large number of DSPs (Digital Signal Processors), and executes a mixing process under the control of the CPU 21. A bus 26 is a common path through which data is transmitted between blocks.

The engine section 2 is further comprised of a computer connection interface (PC I/O) 24*e* to which the computer 46 can be connected, other interfaces 24*f* (another I/O) as interfaces for the control signal input terminal and the time code terminal, a first communication interface (communication I/O) 24*a* that receives a mixing control signal supplied from the console section 1 via the communication line L1, and transmits control signals from the MIDI sequencer 44 and others to the communication line L1, and a first data interface (data I/O) 24*b* that inputs and outputs digital audio signals from and to the communication line L2, to which digital audio signals are transmitted, The digital audio signals transmitted from the console section 1 to the communication line L2 and received by the data interface 24*b* include stereo digital signals input to the console section 1, digital source signals, and a talk back signal as a digitalized voice transmitted from the operator to the stage staff for communication. All these signals are supplied to the signal processing section 25. Further, the digital audio signals output from the data interface 24*b* include a cue signal that is issued if any one of the cue switches provided for the input and output modules is operated, to output a sound corresponding to that module, and a monitor signal.

Furthermore, a second data interface (data I/O) 24*c* receives digital audio signals from the AD unit 31 and the DIO unit 32 through up to 320 channels, and transmits digital audio signals to the DA unit 33 and the DIO unit 32 through up to 192 channels. Moreover, a second communication interface (communication I/O) 24*d* transmits control signals that control various units connected thereto (including, for example, a control signal for controlling the gain of the head amplifier of the MAD card installed in the AD unit 31). The gain of the head amplifier is adjusted so that the level of an analog signal output from the head amplifier has a specified value.

The console section 1 and the engine section 2, which transmit and receive control signals and data to and from each other through the communication lines L1 and L2, are constructed such that the connection between the two sections can be flexibly changed, to thereby realize various constructions. In the digital mixing system thus constructed, if the operation software used by each block is to be upgraded, the operation software for all the connected blocks must be properly upgraded. The connected blocks are the console section 1, the engine section 2, and the units 31, 32, and 33. To this end, the digital mixing system is constructed such that the computer 43 or 46 connected to the console or engine section 1 or 2 can activate and execute upgrading programs to upgrade the operation software stored in flash memories of these blocks.

Figure 14A:
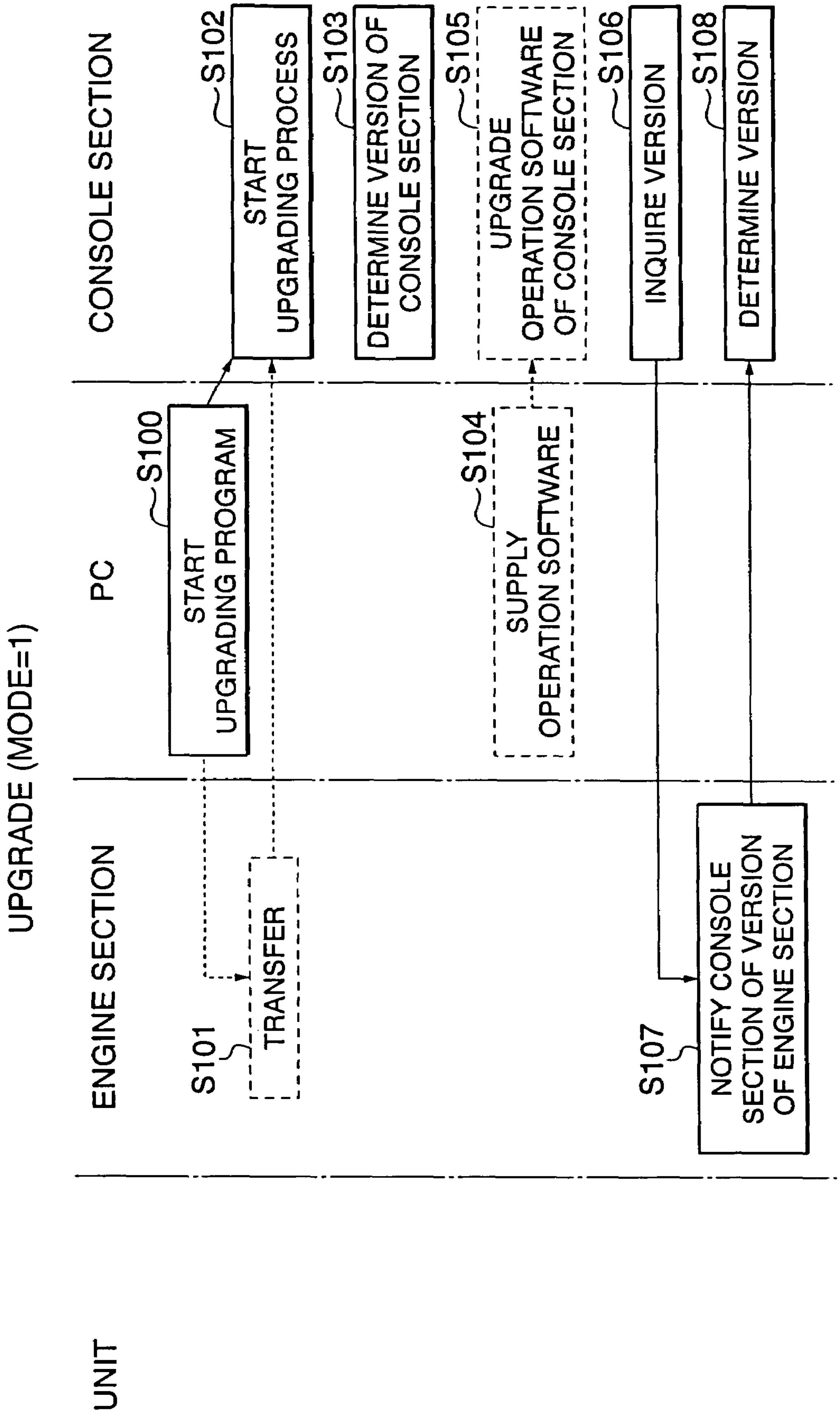
FIGS. 14A and 14B is a view showing the operational flow of an upgrading process.
Figure 14B:
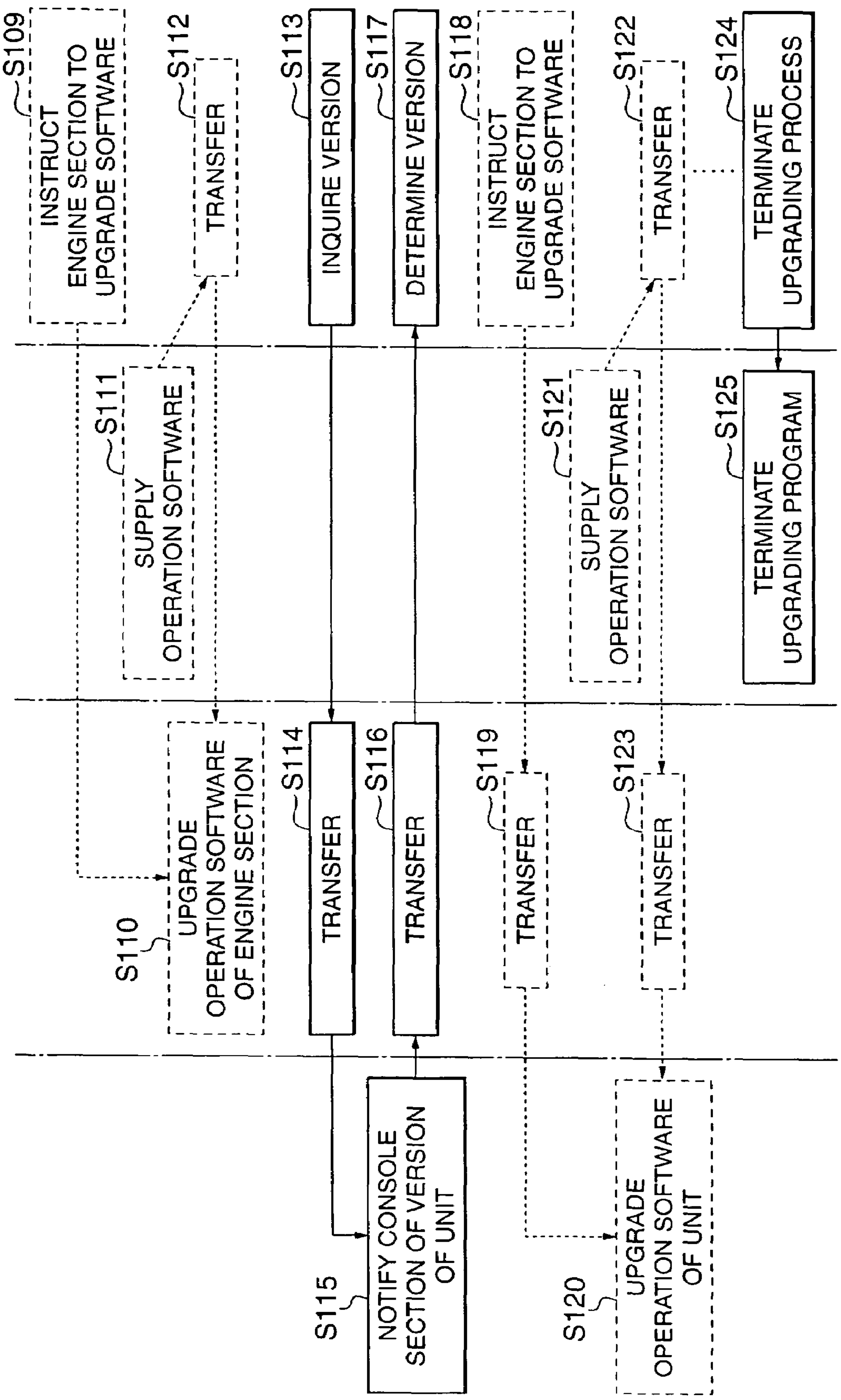

The upgrading operation will be described with reference to the operational flowchart shown in FIGS. 14A and 14B, giving an example of a normal state in which the console section 1 acts as a master (MOED=1) to control the engine section 2 to execute a mixing process.

First, when the computer (PC) 43 connected to the console section 1 activates an upgrading program (step S100), it notifies the console section 1 that an upgrading process is to be executed. On the other hand, if the computer (PC) 46 connected to the engine section 2 activates an upgrading program, it notifies the engine section 2 that an upgrading process is to be executed. In this case, the engine section 2, upon receiving the notification that the upgrading process is to be executed, transfers this notification to the console section 1 (step S101). If the PC 46 is connected to the engine section 2, the PC 46 and the console section 1 communicate with each other via the engine section 2. However, except for this point, the process is the same as that executed if the PC 43 is connected to the console section 1. Therefore, an explanation will be given below of the case in which the PC 43 is connected to the console section 1. Upon receiving the notification from the PC 43 or from the PC 46 via the engine section 2, the console section 1 starts an upgrading process (step S102). The console section 1 detects the version of the operation software stored in its flash memory 12, and determines whether or not the operation software of the upgrading program (hereinafter referred to as "the upgrading operation software") is of a newer version (step S103). If it is determined that the upgrading operation software is of a newer version, the console section 1 receives this software from the PC 43 or PC 46 (step S104), and rewrites the operation software in the flash memory 12 thereof for upgrading (step S105). However, if the version of the upgrading operation software is the same as or earlier than that of the already stored operation software, then the upgrading of the operation software is not executed.

Then, the console section 1 inquires of the engine section 2 about the version (step S106). Responsive to this, the engine section 2 notifies the console section 1 of the version of the operation software stored in its flash memory 22 (step S107). Upon receiving the notification, the console section 1 checks the version of the operation software of the engine section 2 to determine whether or not the upgrading operation software is of a newer version (step S108). If it is determined that the upgrading operation software is of the newer version, the console section 1 instructs the engine section 2 to upgrade the operation software (step S109), while the console section 1 receives the upgrading operation software from the PC 43 or PC 46 (step S111) and transfers it to the engine section 2 (step S112). The engine section 2 uses the upgrading operation software transferred from the console section 1 to rewrite the operation software in its flash memory 22 for upgrading (step S110). However, if the version of the upgrading operation software is the same as or earlier than that of the already stored operation software, then the engine section 2 does not execute the upgrading of the operation software.

Then, the console section 1 inquires of the input or output unit about the version (step S113), but this inquiry signal is received and transferred to the unit by the engine section 2 (step S114). Upon receiving this signal, the unit notifies the console section 1 of the version of the operation software stored in its flash memory (step S115). This notification is received and transferred to the console section 1 by the engine section 2 (step S116). Upon receiving the notification, the console section 1 checks the version of the operation software in the unit to determine whether or not the upgrading operation software for the unit is of a newer version (step S117). If it is determined that the upgrading operation software is of the newer version, the console section 1 instructs the unit to upgrade the operation software (step S118), while the console section 1 receives the upgrading operation software from the PC 43 or PC 46 (step S121) and transfers it to the unit (step S122). This upgrading instruction signal and the upgrading operation software are received and transferred to the unit by the engine section 2 (steps S119 and S123). The unit uses the upgrading operation software transferred from the engine section 2 to rewrite the operation software in its flash memory for upgrading (step S120). However, if the version of the upgrading operation software is the same as or earlier than that of the already stored operation software, then the engine section 2 does not execute the upgrading of the operation software.

The upgrading of the operation software is executed for each of the AD unit 31, the DIO unit 32, and the DA unit 33. Thus, as many upgrading operations as the number of the units connected to the engine section 2 are performed. The console section 1 recognizes the engine section 2 and all the input and output units connected thereto, through communication with the engine section 2 and the units. Thus, upgrading processes for all the blocks constituting the digital mixing system are executed under the control of the console section 1. If the upgrading process is terminated, the console section 1 notifies the PC 43 or PC 46 of this (step S124), and the PC 43 or PC 46 completes the upgrading program (step S125).

Figure 5:
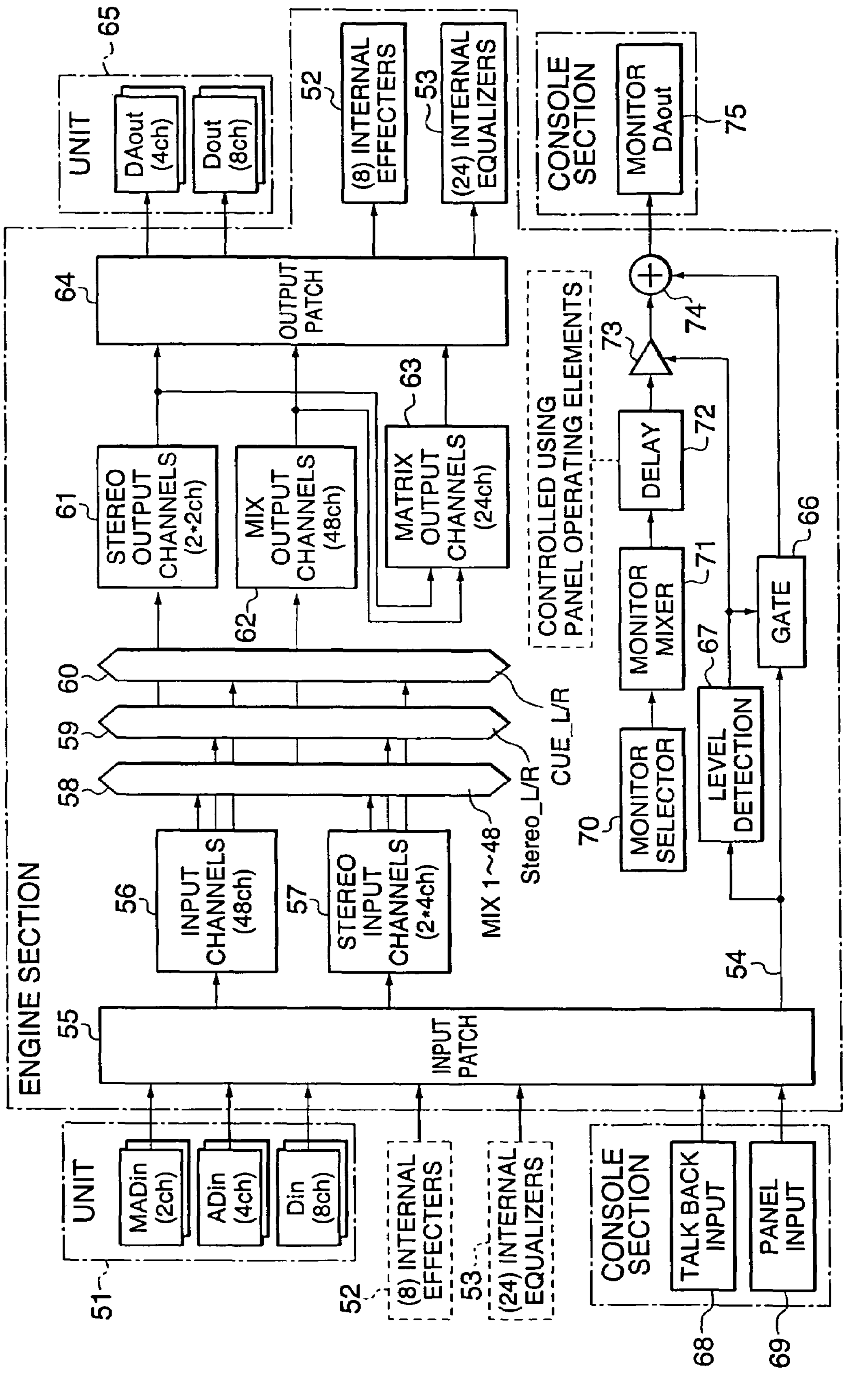
FIG. 5 is a view showing an equivalent hardware construction of the engine section of the digital mixing system.

In the digital mixing system of the present embodiment, the engine section 2, provided with a large number of DSPs, executes a mixing process. That is, a mixing process is executed by the large number of DSPs executing microprograms under the control of the CPU 21. FIG. 5 shows an equivalent hardware construction of the engine section 2 which executes a mixing process in this way.

In FIG. 5, a large number of digital audio signals are input to the engine section 2 from an input unit 51 and the console section 1. The input unit 51 is comprised of a mixture of the AD units 31 and the DIO units 32, and deals with up to 320 input channels. The AD units 31 can each accommodate a plurality of 2-channel analog input cards MADin each internally having a head amplifier and an AD converter corresponding to a microphone/line level, and 4-channel analog input cards ADin each internally having a buffer amplifier and an AD converter corresponding to a line level. The DIO units 32 can accommodate a plurality of 8-channel digital input/output cards corresponding to a main digital format. However, only a digital input section Din of the DIO units 32 is shown because the input unit 51 is concerned here. The digital format may be AES/EBU (Audio Engineering Society/European Broadcasting Union: a standard for business digital audio signals which has been proposed by AES (Audio Engineering Society) and EPU (European Broadcasting Union).

Digital audio signals from a talk back input section 68 comprised of two head amplifiers and two AD converters and a panel input section 69 that inputs digital sources reproduced by a CD player and a DAT as well as analog stereo signals are input the console section 1. The panel input section 69 of the console section 1 has AD converters that digitalize analog stereo signals, and buffer amplifiers. These digital audio input signals input to the engine section 2 are supplied to an input patch 55 that deals with, for example, up to 365 channels. The up to 365 channels dealt with by the input patch 55 are comprised of up to 320 channels from the input unit 51, 16 channels from (eight) internal effectors incorporated in the engine section 2 (stereo×eight channels), 24 channels from (24) internal equalizers 53, one channel from the talk back input, and four channels from the panel input (stereo×two channels). Thus, the input patch 55 also receives digital audio signals which have been given sound effects such as reverb, echo, and chorus and/or have been adjusted in frequency. The input patch 55 patches (connects) signals input through the up to 365 channels into (to) an input channel section 56 comprised of, for example, an input module for 48 channels, a stereo input channel section 57 comprised of, for example, two stereo input modules, and an exclusive channel 54 for the talk back function. A voice signal input from staff on the stage to communicate with the operator at the console section 1 is patched into this exclusive channel 54, while a voice signal input from the talk back input section 68 of the console section 1 which is used by the operator to communicate with the stage staff is patched into any channel of the input channel section 56. Patch settings in the input patch 55 can be arbitrarily made while viewing a screen displayed on the display 15 of the console section 1.

The input module of the input channel section 56 and the stereo input modules of the stereo input channel section 57 are each provided with an equalizer, a noise gate, a compressor, a delay, a fader, and others. Although not described in detail, the frequency characteristics of these input modules and the level thereof at which signals are transmitted to the mixing bus are controlled. Digital output signals on 48 channels from the input channel section 56 are selectively output to one or more of 48 mixing buses (MIX 1 to 48) 58, and also selectively output to a stereo bus (Stereo#L/R) 59 composed of L and R buses, and to a cue signal bus (CUE#L/R) 60 composed of L and R buses. Two digital stereo output signals from the stereo input channel section 57 are also output to the 48 mixing buses (MIX 1 to 48) 58, and also output to the stereo bus (Stereo#L/R) 59 composed of L and R buses, and to the cue signal bus (CUE#L/R) 60 composed of L and R buses.

The mixing buses 58 mix the digital output signals on 48 channels and the two digital stereo output signals selectively input to the respective 48 buses thereof, as programmed, and outputs the resulting mixing outputs to a mixing output channel section (MIX output ch) 62 through 48 channels. Consequently, up to 48 types of mixing outputs are obtained. The mixing output channel section 62 is comprised of 48-channel output modules each composed of an equalizer, a compressor, a delay, and a fader.

The stereo bus 59 mixes the digital output signals on 48 channels and the two digital stereo output signals input to the L and R buses thereof, as programmed, and outputs one stereo mixing output to a stereo output channel section (stereo output ch) 61. The stereo output channel section 61 is comprised of stereo-2-channel output modules each composed of an equalizer, a compressor, a delay, and a fader. The stereo-2-channel output modules are controlled in respective different manners to provide different stereo output signals.

A stereo mixing output from the stereo output channel section 61 and a mixing output from the mixing output channel section 62 are selectively input to a matrix output channel section (MATRIX output ch) 63 and mixed to generate 24 matrix outputs. The matrix output channel section 63 is comprised of 24-channel output modules each composed of an equalizer, a compressor, a delay, and a fader. The 24-channel output modules are controlled in respective different manners to provide 24 different matrix output signals.

The two stereo output signals from the stereo output channel section 61, the 48-channel mixing output signals from the mixing output channel section 62, and the 24-channel matrix output signals from the matrix output channel section 63 are supplied to an output patch 64. The output patch 64 corresponds to, for example, digital output patches for up to 232 channels. The up to 232 channels in the output patch 64 are comprised of 192 channels for an output unit 65, 16 channels (stereo×eight channels) for (eight) internal effectors 52 incorporated in the engine section 2, and 24 channels for (24) internal equalizers 53. Thus, the output signals supplied to the output patch 64 can be patched into (connected to) the output unit 65, the eight internal effectors 52, and the 24 internal equalizers 53. The output unit 65 is comprised of a mixture of the DA units 33 and the DIO units 32, and deals with up to 192 input channels. Each DA units 33 can accommodate a plurality of 4-channel analog output cards DAout each having a DA converter. Each DIO unit 32 can accommodate a plurality of 8-channel digital input/output cards dealing with main digital formats. However, only a digital output section Dout of the DIO units 32 is shown because the output unit 65 is concerned here.

The internal effectors 52 and the internal equalizers 53 apply sound effects such as reverb, echo, and chorus to the digital audio signals, and adjusts the frequency characteristics of these signals. The internal effectors 52 and the internal equalizers 53 are realized by the DSPs constituting the signal processing section 25. As stated before, outputs from the internal effectors 52 and the internal equalizers 53 are input to the input patch 55. Furthermore, analog audio signals output from the output unit 65 are amplified by the power amplifier and emitted from the stage speakers 102. Further, digital audio signals output from the output unit 65 can be digitally recorded on a DAT or the like.

The console section 1 can selectively monitor one or more of the two stereo output signals from the stereo output channel section 61, 48-channel mixing output signals from the mixing output channel section 62, and 24-channel matrix output signals from the matrix output channel section 63. A monitor selector 70 determines which output signals are to be monitored, and the selected monitor signals are mixed by a monitor mixer 71. Then, the mixed signal is delayed by a predetermined time period by a delay circuit 72 and then supplied to a mixer 74 via a buffer amplifier 73, which then mixes it with an audio signal output from a gate circuit 66. The resulting signal is output from the engine section 2. This output is input to the console section 1 via the communication line L2. The output signal is converted into an analog signal by a monitor DA converting section (monitor DAout) 75 incorporated in the console section 1, and is then output from the monitor speakers 101 or the monitor headphone. The monitor DA converting section 75 is comprised of a DA converter and a buffer amplifier. Further, the monitor selector 70, the monitor mixer 71, the delay circuit 72, the buffer amplifier 73, the mixer 74, and the monitor DA converting section 75 are all stereophonically constituted so as to supply stereo analog signals to a stereo headphone. Thus, the operator at the console section 1 can operate the panel buttons on the console section to control a mixing process while monitoring each of the two stereo output signals from the stereo output channel section 61, 48-channel mixing output signals from the mixing output channel section 62, and 24-channel matrix output signals from the matrix output channel section 63.

In this case, if the console section 1 is installed in the area of audience seats or in the monitor room and is thus significantly distant from the stage, a time delay occurs before sound emitted from the stage speaker 102 reaches the operator operating the console section 1. However, the monitor signal for monitoring by the operator is transmitted via the communication line L2, and thus reaches the operator without any time delay. The operator operates the console section 1 so as to control a mixing process while checking sound from the speakers 102 which is being listened to by the audience. However, a sound reflecting the results of a mixing operation can be confirmed as, for example, a monitor sound from the monitor speakers 101. On this occasion, if a time delay occurs between a sound from the stage speakers 102 and a corresponding monitor sound from the monitor speakers 101, the operator cannot easily tell the sounds by hearing. Therefore, the delay circuit 72 is provided to cause a time delay in the monitor signal so as to eliminate the time difference between these sounds. The delay time provided by the delay circuit 72 can be controlled by using corresponding panel buttons on the console section 1, so that the operator can control the delay time provided by the delay circuit 72 based on the installation site of the console section 1 and the distance from the console section 1 to the stage. At a concert or the like, the delay time may vary while the system is in operation. For example, if a plurality of stage speakers are provided and switched while the system is in operation, the delay time varies between before and after the switching because a change occurs in the distance between the stage speakers and the console section 1. In the digital mixing system according to the present embodiment, the panel of the console section is provided with an exclusive dial used to control the delay time provided by the delay circuit 72 so that the operator can respond quickly to a change in the time delay with a change the circumstances.

Further, a talk back signal used by the operator to communicate with staff on the stage, which is input to the input patch 55 from the talk back input section 68 of the console section 1, is patched into a certain channel of the input channel section 56 by the input patch 55. This talk back signal for communication is supplied to the output patch 64 via one of the mixing buses 58 and the mixing output channel section 62, then patched into a certain channel of the DA unit, and then sounded from any one of the stage speakers 102. Thus, the operator can communicate with the stage staff.

Furthermore, a voice signal generated by staff on the stage speaking over a microphone to communicate with the operator at the console section 1 is input to the input patch 55 through the input unit 51, then patched into the exclusive channel 54, and then supplied to the gate circuit 66 and a level detector 67. The level detector detects whether or not the level of the input voice signal for communication is equal to or higher than a reference level. If it is detected that the level of the input voice signal for communication is equal to or higher than the reference level, the level detector 67 causes the gate circuit 66 to be opened, and controls the buffer amplifier 73 to reduce its gain. When the gate circuit 66 is opened, the voice signal is supplied to the mixer 74 through the gate circuit 66. Further, since the gain of the buffer amplifier 73 decreases, the level of a monitor signal output from the buffer amplifier 73 is reduced. Accordingly, when the operator at the console section 1 hears a mixed sound composed of the monitor signal output from the mixer 74 and the voice signal for communication, the stage staff's voice is prevented from being drowned out by the monitor sound because the level of the monitor signal has been reduced. This ensures that the stage staff can communicate with the operator. Further, the gate circuit 66 blocks signals such as noise which are below the reference level, so as to prevent noise or unwanted sounds from being transmitted.

Figure 6A:
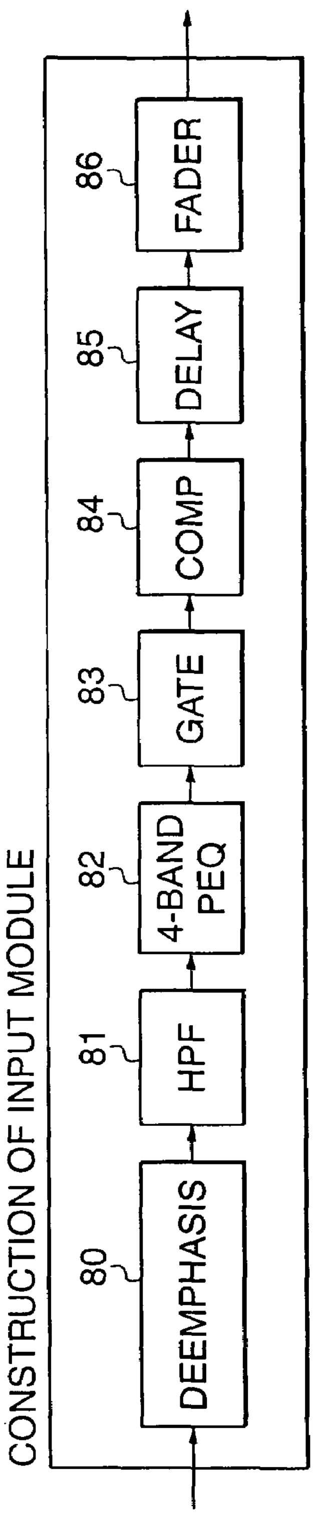
FIGS. 6A and 6B are views showing the construction of input and output modules of the engine section.

FIG. 6A shows an example of the construction of the input module of the input channel section 56 and the stereo input modules of the stereo input channel section 57 in the engine section 2, shown in FIG. 5.

As shown in FIG. 6A, each input module is comprised of a deemphasis 80, a high pass filter (HPF) 81, a four-band parametric equalizer (PEQ) 82, a noise gate (GATE) 83, a compressor (COM) 84, a delay (DELAY) 85, and a fader 86, which are connected together in cascade arrangement. The deemphasis 80 suppresses high-frequency components of input digital audio signals, and the HPF 81 cuts off unwanted low-frequency components. The 4-band PEQ 82 is an equalizer that adjusts the frequency characteristics of input digital audio signals, and can change the frequency characteristics for each of four bands HI, MID HI, LOW MID, and LOW. The GATE 83 is a noise gate that shuts out noise in such a manner that when the level of an input digital audio signal decreases below a reference value, the GATE 83 rapidly reduces the gain of this signal to shut out noise. The COMP 84 narrows the dynamic range of the input digital audio signal to prevent the signal from being saturated. The DELAY 85 temporally delays the input digital audio signal so as to make correction for the distance between the sound source and the corresponding microphone. The suppression characteristics of the deemphasis 80, the equalizer characteristics of the 4-band PEQ 82, the reference value of the GATE 83, the compression characteristics of the COMP 84, the delay characteristics of the DELAY 85, and the like can be changed and controlled using corresponding buttons 17 on the console section 1. The fader 86 (a part of the electric fader 16) is level varying means for controlling the level at which signals are transmitted to the mixing bus 58, and is electrically driven.

Figure 6B:
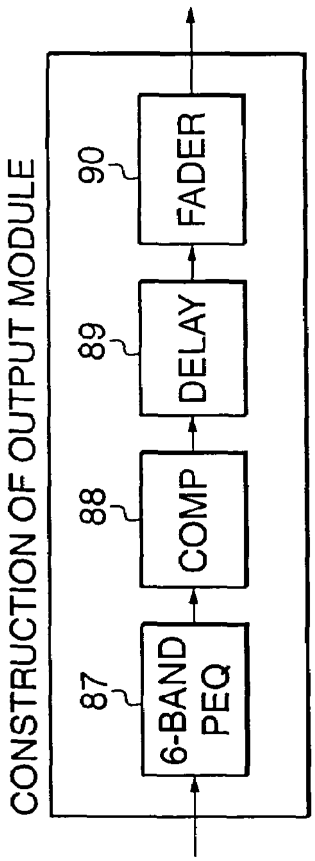

FIG. 6B shows an example of the construction of the output modules of the stereo output channel section 61, mixing output channel section 62, and matrix output channel section 63 in the engine section 2, shown in FIG. 5.

As shown in FIG. 6B, each output module is comprised of a 6-band parametric equalizer (PEQ) 87, a compressor (COM) 87, a delay (DELAY) 89, and a fader 90, which are connected together in cascade arrangement. The 6-band PEQ 87 is an equalizer that adjusts the frequency characteristics of an output digital audio signal, and can change electric characteristics for each of six bands HI, MID HI, MID, LOW MID, LOW, and SUB MID. The COMP 88 narrows the dynamic range of the output digital audio signal to prevent the signal from being saturated. The DELAY 89 temporally delays the output digital audio signal so as to make corrections for the distance from the speaker, the localization of the sound source, and the like. The equalizer characteristics of the 6-band PEQ 87, the compression characteristics of the COMP 88, the delay characteristics of the DELAY 89, and the like can be changed and controlled using corresponding buttons 17 on the console section 1. The fader 90 (a part of the electric fader 16) is level varying means for controlling the level at which signals are output to the power amplifier or the like, and is electrically driven.

Figure 7A:
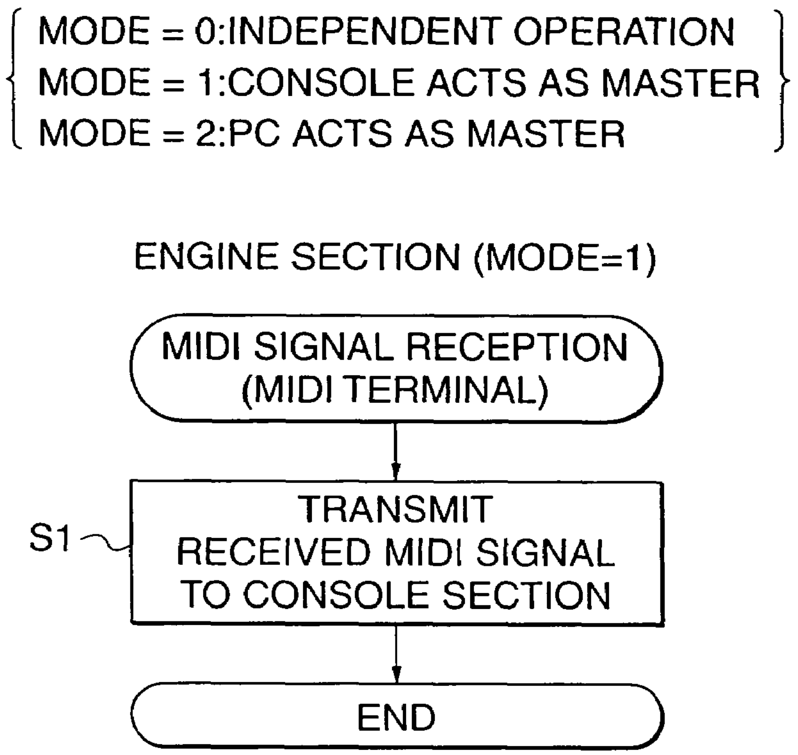
FIGS. 7A and 7B are flow charts showing a MIDI signal receiving process (MODE=1) executed when a MIDI signal is supplied to the engine section, and a control signal receiving process (MODE=1) executed when the engine section receives a control signal, respectively.
Figure 7B:
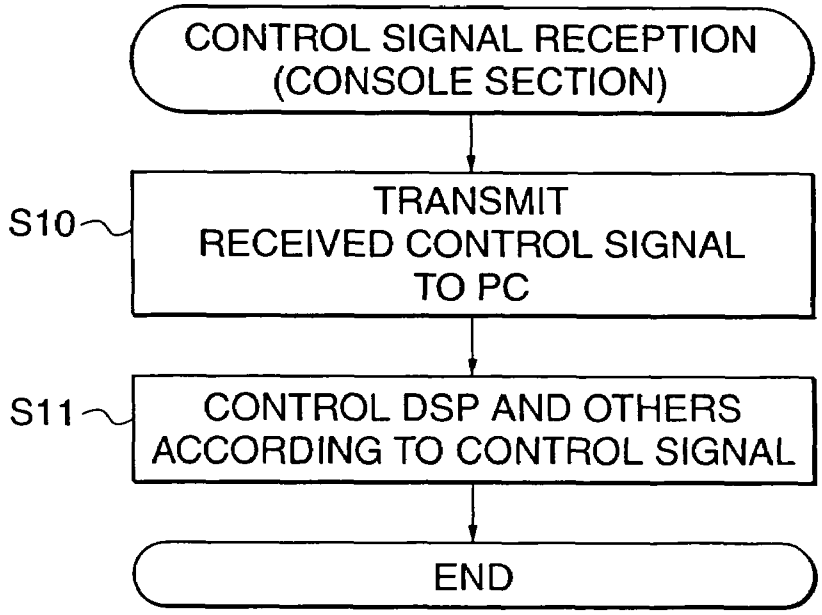

FIG. 7A is a flow chart of a MIDI signal receiving process (MIDI terminal) executed when the MIDI sequencer 44 supplies a MIDI signal to the engine section 2. FIG. 7B is a flow chart of a control signal receiving process (console section) executed when the engine section 2 receives a control signal from the console section 1.

Before describing these processes with reference to these flow charts, the operation mode (MODE) of the engine section 2 of the digital mixing system according to the present embodiment will be described. In a normal state in which the digital mixing system operates normally, the console section 1 acts as a master to control the engine section 2. On this occasion, the operation mode of the engine section 2 is set to "1" (MODE=1). On the other hand, if a fault occurs in the engine section 2 or the communication line L1 or L2 is disconnected, the computer (PC) 43 connected to the console section 1 or the computer (PC) 46 connected to the engine section 2, acts as a master to control the engine section 2. On this occasion, the operation mode of the engine section 2 is set to "2" (MODE=2). On the other hand, if a fault occurs in the console section 1 or the communication line L1 or L2 is disconnected and at the same time no computer is connected to the console section 1 or the engine section 2, the engine section 2 operates independently. On this occasion, the operation mode of the engine section 2 is set to "0" (MODE=0).

FIGS. 7A and 7B are flow charts of the normal state in which the console section 1 acts as a master and the operation mode of the engine section 2 is set to 1 (MODE=1).

When the MIDI terminal, i.e. the control signal input terminal provided in the engine section 2 receives a MIDI signal, the MIDI signal receiving process (MIDI terminal), shown in FIG. 7A, is started. In a step S1, the received MIDI signal is transmitted to the console section 1. Then, this MIDI signal receiving process is terminated.

On the other hand, when the engine section 2 receives a mixing control signal from the console section 1, the control signal receiving process (console section), shown in FIG. 7B, is started. In a step S10, the received mixing control signal is transmitted to the PC 46 connected to the engine section 2 to notify the PC 46 of the mixing state. Then, in a step S1, parameters are set for the signal processing section 25 in accordance with the received mixing control signal to control the DSPs and others. Then, this control signal receiving process is terminated. In this way, the engine section 2 executes a mixing process in accordance with a mixing operation at the console section 1.

Figure 8:
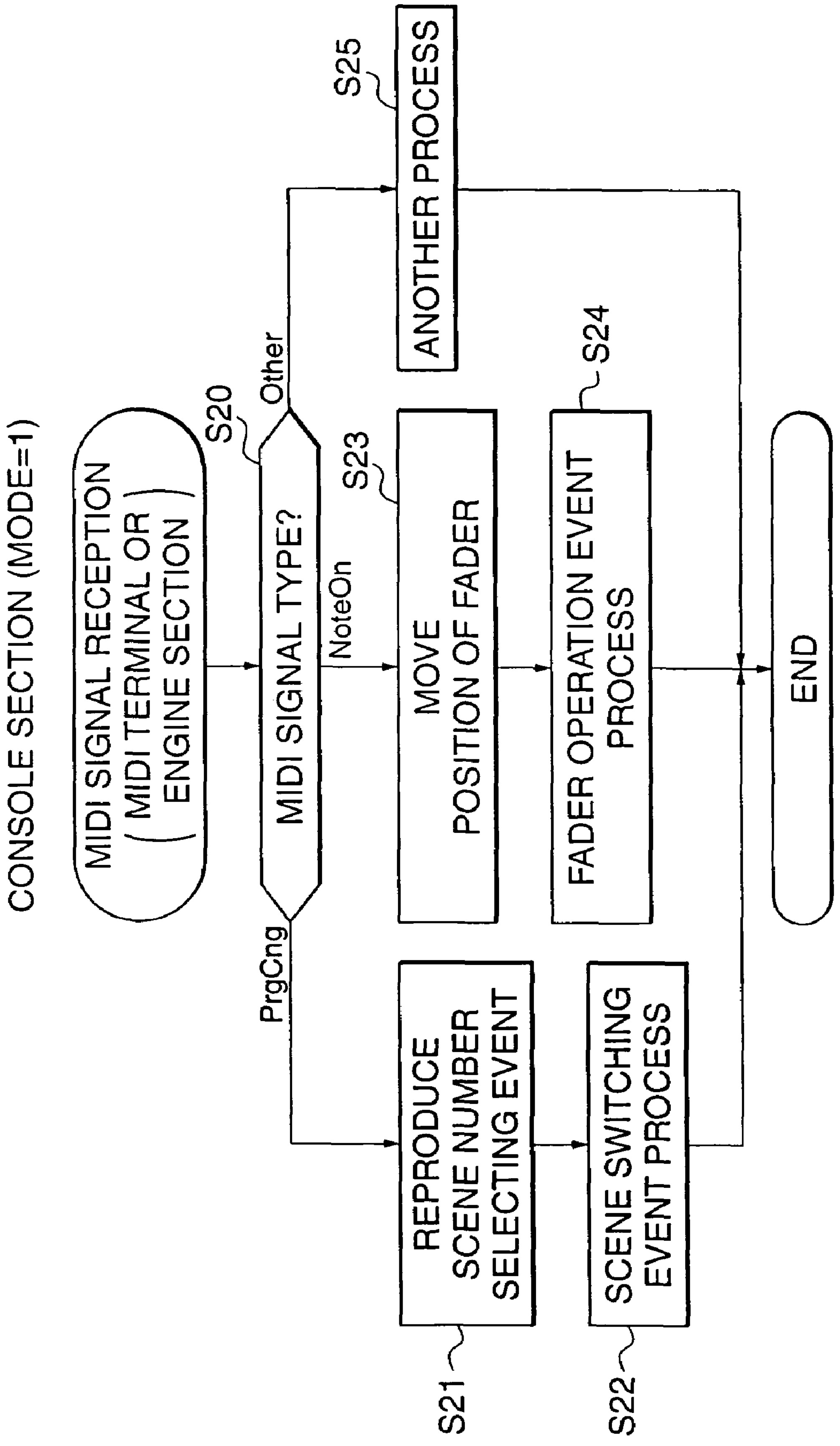
FIG. 8 is a flow chart showing a MIDI signal receiving process (MODE=1) executed when the console section receives a MIDI signal.

FIG. 8 shows a flow chart a MIDI signal receiving process (MIDI terminal or engine section) executed by the console section 1 when it receives a MIDI signal from the engine section 2 or the control signal input terminal thereof in the normal state in which the operation mode of the engine section 2 is set to "1" (MODE=1).

In FIG. 8, when the console section 1 receives a MIDI signal transmitted as a result of the above described MIDI signal receiving process at the engine section 2 or receives a MIDI signal from the MIDI terminal as the control signal input terminal thereof provided in the console section 1, a MIDI signal receiving process (MIDI terminal or engine section) is started. In a step S20, the type of the received MIDI signal is determined. If it is determined that the MIDI signal indicates a program change message (PrgCng), the process proceeds to a step S21 to execute a scene number selection event reproducing process of setting a scene number corresponding to a program number in the program change message. This scene number selection event reproducing process is similar to a process executed when a panel button provided on the console 1 for selecting a scene number is operated. Then, in a step S22, a scene switching event process is executed as follows: Data set for the set scene number is read from the scene memory, a work area for the console section 1 is updated in accordance with the set data, and a corresponding mixing control signal is generated and transmitted to the engine section 2, and the positions of the electric fader 16 and buttons 17, the display state of the display 15, and the like on the panel of the console section 1 are updated based on the contents of the work area. Then, this MIDI signal receiving process is terminated. When the engine section 2 receives the transmitted mixing control signal, the control signal receiving process, shown in FIG. 7B, is executed, to carry out a mixing process that switches to a scene corresponding to the program number.

Further, if the MIDI signal is determined to indicate a note on message (NoteOn), the process proceeds to a step S23 to move the position of the electric fader for a channel corresponding to a note number in the note on message, according to the value of a velocity in the note on message. Then, in a step S24, a fader operation event process is executed, to generate a mixing control signal corresponding to the value of the velocity in the note on message or the moved position of the electric fader and then transmit the signal to the engine section 2. Then, the MIDI signal receiving process is terminated.

Furthermore, if the MIDI signal is determined to indicate another type of message (Other), the process proceeds to a step S25 to execute a process corresponding to the received message. Then, this MIDI signal receiving process is terminated.

Figure 9A:
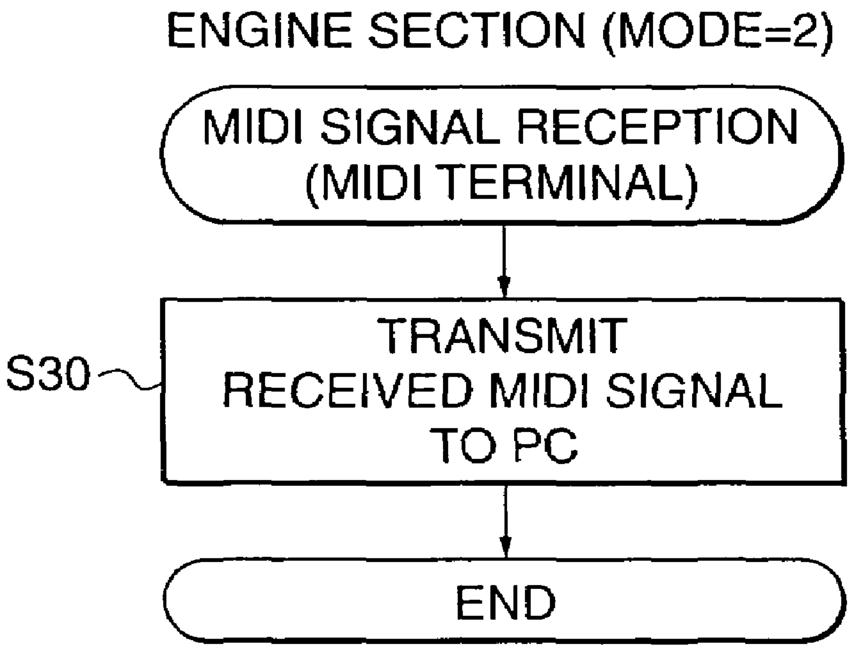
FIGS. 9A and 9B are flow charts showing a MIDI signal receiving process (MODE=2) executed when a MIDI signal is supplied to the engine section, and a control signal receiving process (MODE=2) executed when a computer receives a control signal, respectively.
Figure 9B:
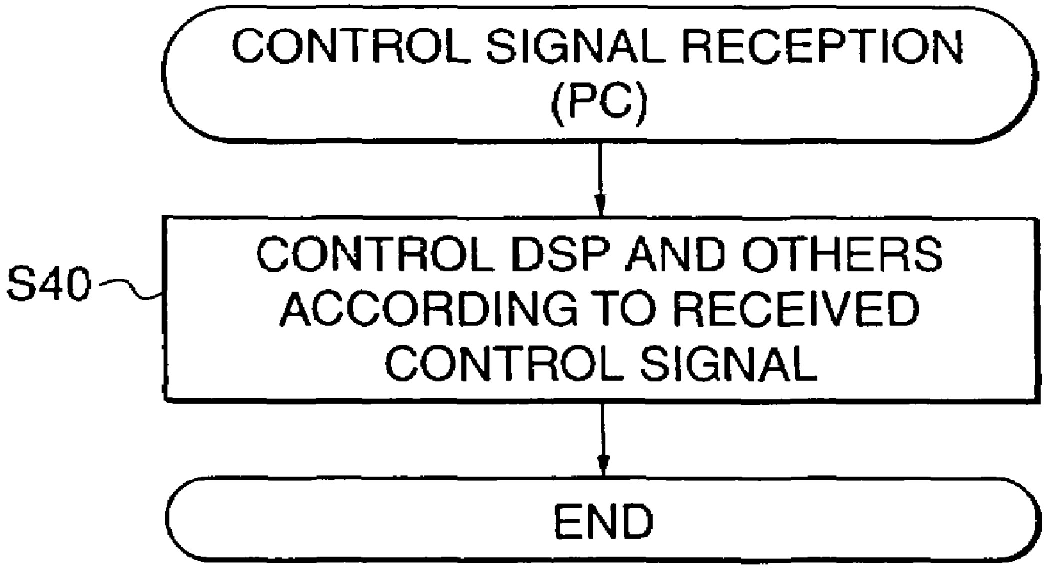

FIG. 9A shows a flow chart of a MIDI signal receiving process (MIDI terminal) executed when the engine section 2 receives a MIDI signal in the event that a fault occurs in the console section 1 and the computer 43 connected to the console section 1 or the computer 46 connected to the engine section 2 acts as a master (MODE=2). FIG. 9B is a flow chart of a control signal receiving process (PC) executed when the engine section 2 receives a control signal.

If MODE=2, when the MIDI terminal as the control signal input terminal provided in the engine section 2 receives a MIDI signal, the MIDI signal receiving process (MIDI terminal), shown in FIG. 9A, is started. In a step S30, the received MIDI signal is transmitted to the computer 43 connected to the console section 1 or the computer 46 connected to the engine section 2, which acts as a master. Then, this MIDI signal receiving process is terminated.

On the other hand, if MODE=2, when the engine section 2 receives a mixing control signal from the computer 43 or 46, the MIDI signal receiving process (PC), shown in FIG. 9B, is started. In a step S40, parameters are set for the signal processing section 25 in accordance with the received mixing control signal to control the DSPs and others in the signal processing section 25. In this way, the engine section 2 executes a mixing process in accordance with a mixing operation at the computer 43 or 46.

Figure 10:
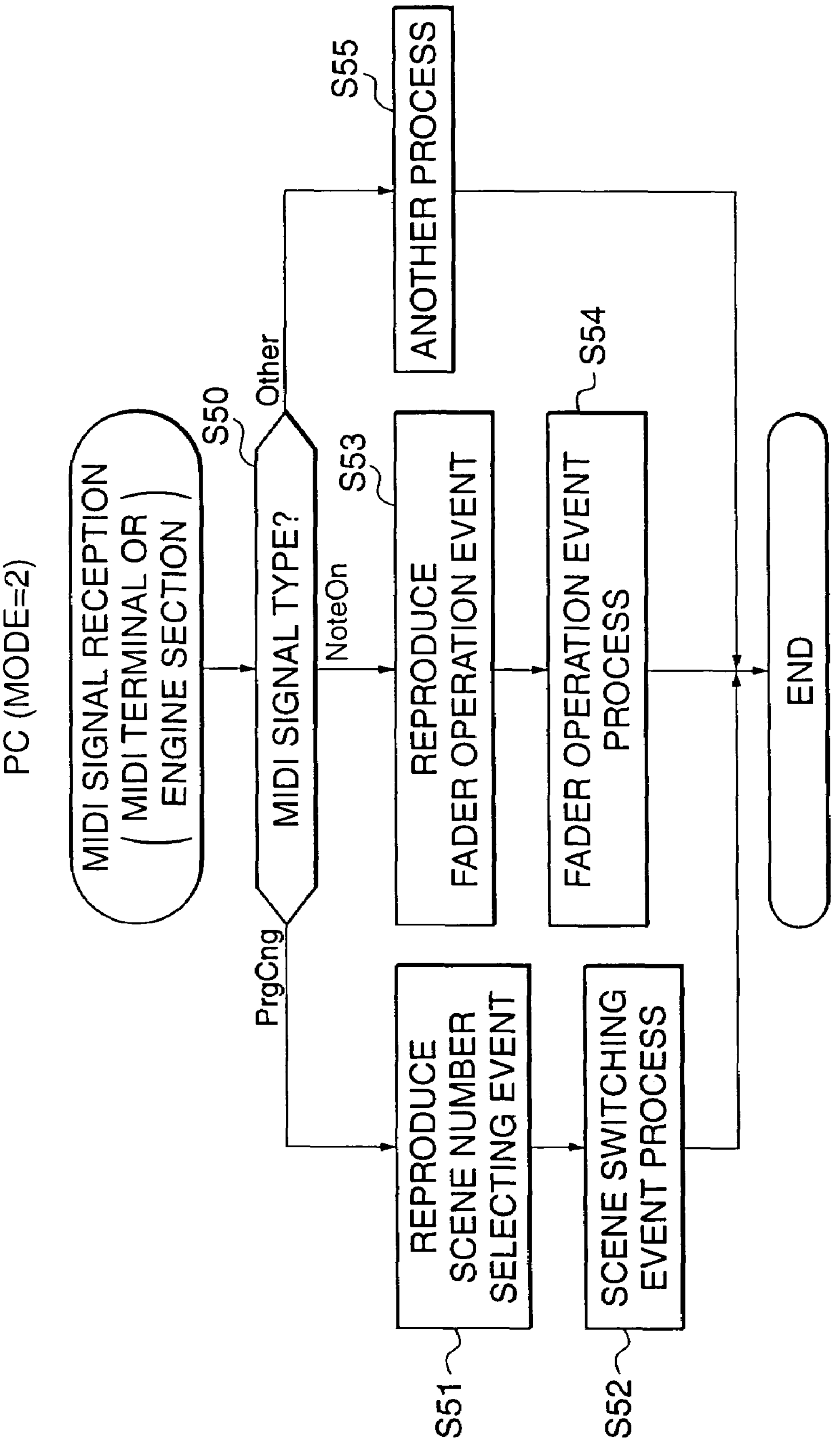
FIG. 10 is a flow chart showing a MIDI signal receiving process (MODE=2) executed when the computer receives a MIDI signal.

FIG. 10 is a flow chart of a MIDI signal receiving process (MIDI terminal or engine section) executed when the computer 43 or 46 acts as a master (MODE=2) and the computer 43 or 46, acting as a master, receives a MIDI signal from the engine section 2 or the control signal input terminal.

If MODE=2 as described above, when the computer 43 or 46, acting as a master, receives a MIDI signal transmitted as a result of the MIDI signal receiving process (MIDI terminal) executed by the engine section 2 or receives a MIDI signal from the MIDI terminal as the control signal input terminal provided in the console section 1, a MIDI signal receiving process (MIDI terminal or engine section), shown in FIG. 10, is started. In a step S50, the type of the received MIDI signal is determined. If it is determined that the MIDI signal indicates a program change message (PrgCng), the process proceeds to a step S51 to execute a scene number selection event reproducing process that sets a scene number corresponding to a program number in the program change message. This scene number selection event reproducing process is similar to a process executed when panel buttons provided on the console 1 to select a scene number are operated. Then, in a step S52, a scene switching event process is executed, to read out data set for the set scene number from the scene memory, generate a mixing control signal corresponding to the set data, and then transmit this signal to the engine section 2. Then, this MIDI signal receiving process is terminated. When the engine section 2 receives the transmitted mixing control signal, the control signal receiving process, shown in FIG. 9B, is executed, and a mixing process is executed to switch to a scene corresponding to the program number.

Further, if the MIDI signal is determined to indicate a note on message (NoteOn), the process proceeds to a step S53 to execute a fader operation event reproducing process that moves, based on the value of a velocity in the note on message, the fader for a channel designated by the note number in the message and displayed on the display section of the computer 43 or 46, acting as a master. Then, in a step S54, a fader operation event process is executed, which generates a mixing control signal that controls the level of the designated channel according to the position of the fader and then transmits this signal to the engine section 2. Then, the MIDI signal receiving process is terminated.

Furthermore, if the MIDI signal is determined to indicate another type of message (Other), the process proceeds to a step S55 to execute a process corresponding to the received message. Then, this MIDI signal receiving process is terminated.

Moreover, in the computer acting as a master if MODE=2, the mixing control program is activated and executed.

Figure 11A:
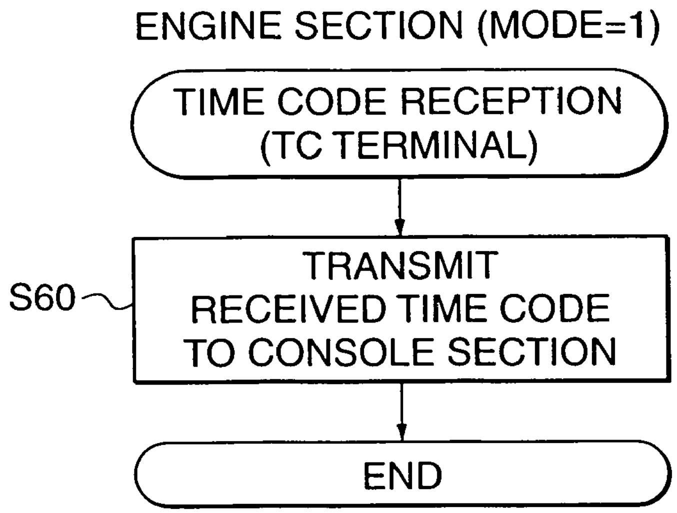
FIGS. 11A and 11B are flow charts showing a time code receiving process (MODE=1) executed when the engine and console sections receive a time code.
Figure 11B:
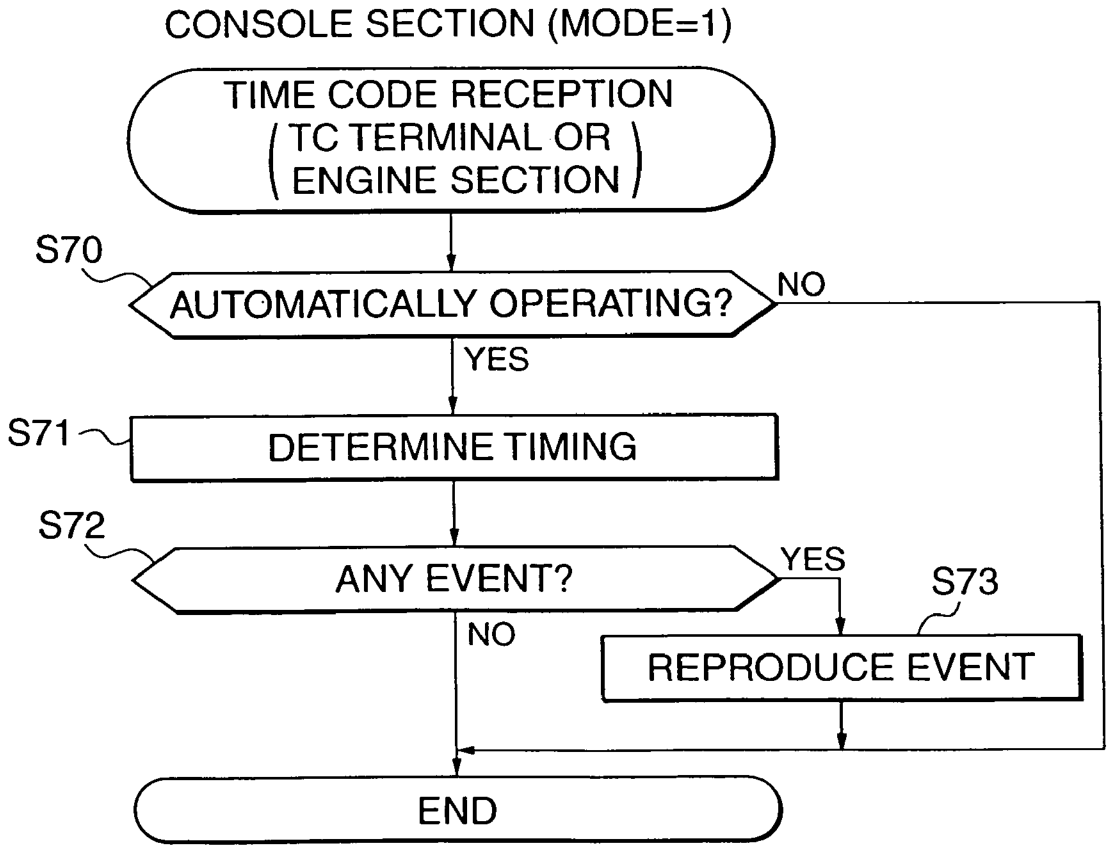

FIGS. 11A and 11B are flow charts of a time code receiving process executed by the engine section 2 and the console section 1. This time code receiving process is executed in the normal state in which the console section 1 acts as a master and MODE=1.

When the time code terminal of the engine section 2 receives a time code from the HDR 45 or the like, a time core receiving process (TC terminal), shown in FIG. 11A, is started. In a step S60, the received time code is transmitted to the console section 1. Then, this time code receiving process is terminated.

On the other hand, when the console section 1 receives a time code transmitted from the engine section 2 as a result of the time code receiving process, shown in FIG. 11A, or the time code terminal of the console section 1 receives a time code from the HDR 42 or the like, a time code receiving process (TC terminal or engine section), shown in FIG. 11B, is started. In a step S70, it is determined whether or not a mixing process is being automatically executed, based on mixing data (a stream of operation event data for the console section 1 which is provided with time stamps) read out from the HDR 42 or the like. If it is determined that an automatic operation is being performed, the process proceeds to a step S71 to determine whether or not there is any operation event data provided with a time stamp corresponding to a time indicated by the received time code. Then, in a step S72, if it is determined that there is operation even data for this timing, the process branches off to a step S73 to perform an event reproducing operation that reproduces an operation event for the console section 1 corresponding to this operation event data. Then, the state of the console section 1 is changed based on the reproduced operation event, and a corresponding mixing control signal is transmitted to the engine section 2. Thus, based on the mixing data read out from the HDR 42 or the like, a mixing process can be automatically executed in synchronism with the time code. On the other hand, if it is determined that there is no operation event data for the time indicated by the time code, the time code receiving process is terminated. Furthermore, in the step S70, if it is determined that no automatic operation is being performed, it is not necessary to execute a mixing process based on the time code, so that the time code receiving process is terminated.

Now, a process of setting the operation mode of the engine section 2 will be described. In an initialization state in which the digital mixing system of the present embodiment has been turned on, it is determined whether or not the console section 1 is connected to the engine section 2. If it is determined that the console section 1 is connected to the engine section 2, the operation mode of the engine section 2 is set to "1" (MODE=1). On the other hand, if it is determined that the console section 1 is not connected to the engine section 2 and a computer is connected to the console section 1 or the engine section 2, the operation mode of the engine section 2 is set to "2" (MODE=2). Furthermore, if it is determined that the console section 1 is not connected to the engine section 2 and no computer is connected to the console section 1 or the engine section 2, the operation mode of the engine section 2 is set to "0" (MODE=0). If the operation mode of the engine section 2 is set to "2" (MODE=0), all the faders are attenuated to their limits, and all the sound effects are turned off, so as to prevent unwanted sounds from being output.

The operation mode of the engine section 2 should be determined by the state of the digital mixing system at the current time, and therefore the engine section 2 and the console section 1 are set to respective proper operation modes using timer interruption. In this embodiment, the engine section 2 is subjected to a communication line checking process (timer), shown in the flow chart in FIG. 12, which checks whether or not the communication lines L1 and L2 are connected to the engine section 1. The console section 1 is subjected to an operation checking process (timer), shown in the flow chart in FIG. 13, which checks the operation of the console section 1. These processes will be described below.

Figure 12:
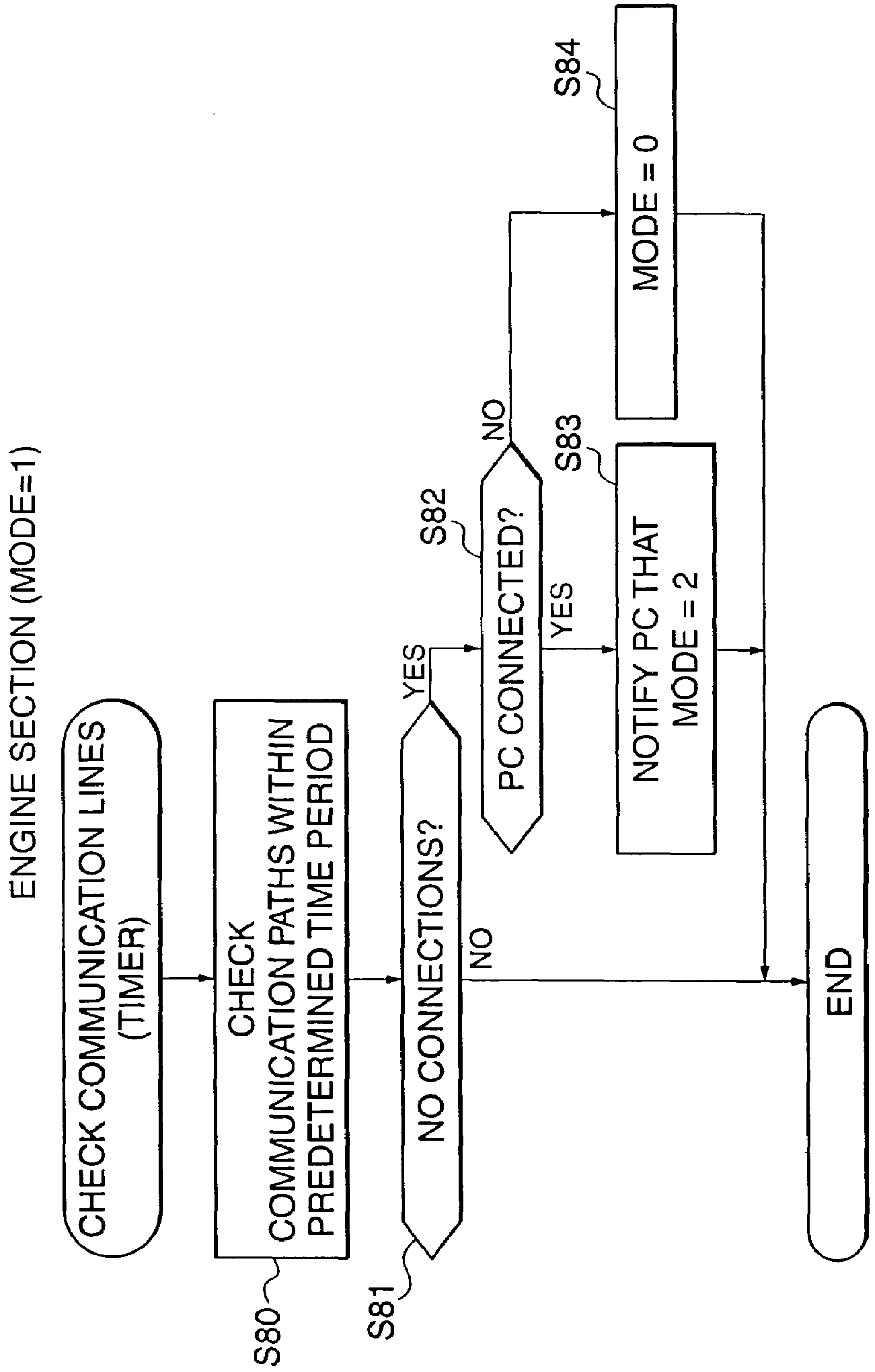
FIG. 12 is a flow chart showing a communication line checking process executed by the engine section.

The communication line checking process (timer) for the engine section 2 is carried out by the engine section 2 in the normal state (MODE=1) in which the engine section 2 is controlled by the console section 1. If a timer interruption occurs in the engine section 2, the communication line checking process (timer), shown in FIG. 12, is started. In a step S80, it is checked over a predetermined time period whether or not the communication lines L1 and L2 are connected to the engine section 2. In a step S81, a decision is made as to whether or not the communication lines L1 and L2 are connected to the engine section 2. If the communication lines L1 and L2 are present and are normally connected to the engine section 2, then the communication line checking process is terminated. On the other hand, if it is determined in the step S81 that the communication lines L1 and L2 are not connected to the engine section 2, the process branches off to a step S82 to determine whether or not the computer 46 is connected to the engine section 2. If it is determined that the computer 46 is connected to the engine section 2, then in a step S83, the operation mode of the engine section 2 is set to "2" (MODE=2). The computer 46 is notified that it should act as a master. On the other hand, if it is determined in the step S82 that the computer 46 is not connected to the engine section 2, the process branches off to a step S84 to set the operation mode of the engine section 2 to "0" (MODE=0). In this case, all the faders are attenuated to their limits, and all the sound effects are turned on so as to prevent unwanted sounds from being output. Once the processing in step S83 or S84 is completed, the communication line checking process is terminated.

Figure 13:
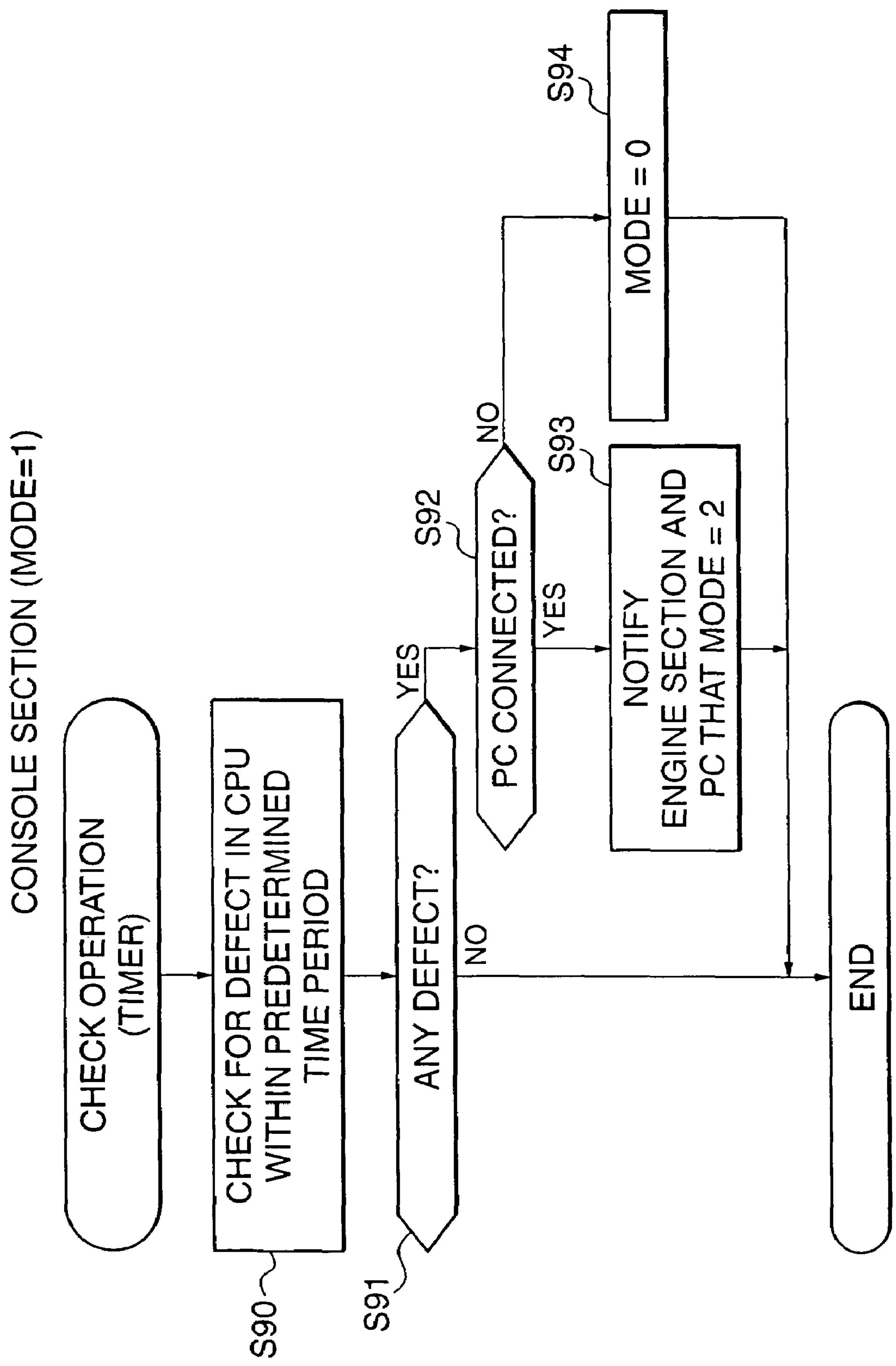
FIG. 13 is a flow chart showing an operation checking process executed by the console section.

The operation checking process (timer) for the console section 1 is carried out by the console section 2 in the normal state (MODE=1) in which the engine section 2 is controlled by the console section 1. The console section 1 always monitors whether various devices that constitute the console section 1 or various programs are malfunctioning, for example, abnormal output or unexpected non-response of various kinds of hardware such as the electric fader 1 and the panel operating elements 17 or software programs being executed by the CPU 11. If a timer interruption occurs in the console section 1, the operation checking process (timer), shown in FIG. 13, is started. In a step S90, the CPU 11 of the console section confirms whether an abnormality has been detected within a predetermined time period corresponding to the timer interruption period. If no abnormality has been detected within the predetermined time period, then in a step S91, it is determined that the CPU 11 is normal, and the operation checking process is then terminated. If any abnormality has been detected, then the process branches off to a step S92 to determine whether or not the computer 43 is connected to the console section 1. If it is determined that the computer 43 is connected to the console section 1, then in a step S93, the operation mode of the engine section 2 is set to "2" (MODE=2). The computer 43 and the engine section 2 are notified that the computer 43 should act as a master. On the other hand, if it is determined in the step S92 that the computer 43 is not connected to the console section 1, the process branches off to a step S94 to set the operation mode of the engine section 2 to "0" (MODE=0). In this case, all the faders are attenuated to their limits, and all the sound effects are turned on so as to prevent unwanted sounds from being output. Once the processing in step S93 or S94 is completed, the operation checking process is terminated. Further, the console section 1 has a failsafe function performed by hardware in the form of wiring for example in case of occurrence of an abnormality in the CPU 11 or the communication interface 14 itself. For example, as one of the hardware for performing such a failsafe function, the communication interface 14*c* and the computer connection interface 14*d* can be physically connected with each other by means of an electronic switch or the like. The CPU 11 updates the wiring at the time of termination of the above operation checking process so that the connection between the above interfaces causes the operation mode to be set to "1" (MODE=1). When an abnormality occurs in the CPU 11 such that the wiring cannot be updated so as to cause the operation mode to be set to "1" (MODE=1), the wiring is automatically switched such that the operation mode is set to "2" (MODE=2). Further, in the event that an abnormality occurs in the communication interface 14*c* itself, the wiring is automatically switched such that the computer connection interface 14*d* is directly connected to the communication line L1.

In the case of MODE=0 or MODE=2 as well, the states of the engine section 2 and console section 1 are always checked, and the operation mode is automatically changed according to the result of the checking, as is the case with MODE=1. Specifically, if the engine section 2, operating with MODE=0, detects that the normally operating console section 1 is connected to the engine section 2, the engine section 2 and the console section 1 are set to "1" (MODE=1). On the other hand, if the engine section 2, operating with MODE=0, detects that the normally operating computer 46 is connected to the engine section 2, the engine section 2 and the computer 46 are set to "2", (MODE=2). Furthermore, if the engine section 2, operating with MODE=2, detects that the normally operating console section 1 is connected to the engine section 2, the engine section 2, the console section 1 and the computer 46 are set to "1" (MODE=1).

As described above, if a fault occurs in one or both of the two communication lines L1 and L2 connecting the console section 1 and the engine section 2 together or in the console section 1, a mixing process executed by the engine section 2 can be controlled by connecting the computer 46 to the computer connection interface provided in the engine section 2. However, since the computer 46 can control the mixing process executed by the engine section 2 by simply connecting the computer 46 to the computer connection interface of the engine section 2, a simple digital mixing system can be constructed by providing only the engine section 2 and the computer 46 and without the console section 1 and the communication lines L1 and L2. Therefore, the control of the mixing process executed by the engine section 2 by the computer 46 should not be limited to the case where a fault occurs in one or both of the two communication lines L1 and L2 or in the console section 1 but also can always be carried out in a digital mixing system simply constructed by providing only the engine section 2 and the computer 46.

Since the digital mixing system according to the present embodiment is constructed as described above, a control signal input to the engine section is transmitted to the control section via the communication lines. Thus, whether a control signal is input to the console section or to the engine section, the console section outputs a mixing control signal based on this control signal. As a result, the engine section and the console section can consistently perform an operation related to mixing in accordance with the control signal input to the engine section or the console se.

Further, since the engine section and the console section are each provided with a computer connection interface, a mixing process executed by the engine section can be remotely controlled by a computer connected to the computer connection interface of the engine section or the console section being caused to execute a mixing control program or the operator operating a large number of panel buttons displayed on the screen. Thus, even if one or both of the communication lines are disconnected, the computer connected to the computer connection interface of the engine section can control the mixing process executed by the engine section. Further, even if a fault occurs in the console section, the computer connected to the computer connection interface of the console section can control the mixing process executed by the engine section via the communication lines.

Furthermore, when the computer connected to the computer connection interface of the console section or the engine section executes an upgrading program, operation software stored in non-volatile memories in both the console section and the engine section is rewritten. Thus, by simply causing the externally connected computer to execute an upgrading program, the operation software of both the console and engine sections can be collectively upgraded. Further, if input and output units are provided, the operation software of these input and output units can be simultaneously upgraded. Therefore, the operation software of the digital mixing system can be collectively upgraded.

In this regard, when upgrading of operation software, the version of the existing operation software may be checked so that the software is upgraded only if the upgrading results in a newer version.

Moreover, a monitor signal for monitoring by the operator at the console section is delayed by a time period required for sound from a stage speaker to reach the operator at the console section, whereby a sound emitted from the stage speaker and a sound emitted from a monitor speaker reach the operator almost at the same time. As a result, the operator can properly perform a mixing operation of adjusting a sound emitted from the stage speaker while comparing it with a corresponding monitor sound emitted from the monitor speaker, which is being adjusted.

Furthermore, an exclusive signal system for communication between the console section and the stage is provided, thereby minimizing the reduction of resources for input channels. Moreover, when the level of a voice sound output to the exclusive signal system exceeds a certain value, the level of a monitor sound emitted from the monitor speaker is reduced while the voice sound is output to the exclusive signal system. As a result, a voice sound for communication can be prevented from being drowned out by a monitor sound.

What is claimed is:

1. A digital mixing system having a plurality of input signal systems and a plurality of output signal systems, wherein input signals from said plurality of input signal systems are subjected to a mixing process and the mixed signals are output to said plurality of output signal systems, the system comprising:

a console section including panel operating elements used to input parameters relating to the mixing process, a computer connection interface, a first communication interface, an output device that outputs at least a mixing control signal in response to operation of said panel operating elements, and a first non-volatile memory that stores a first operation program;

an engine section including a mixing processing device that executes the mixing process of mixing the input signals from said plurality of input signal systems based on the mixing control signal output from said output device and outputting the mixed signals to said plurality of output signal system, a second communication interface, and a second non-volatile memory that stores a second operation program;

communication lines connecting between said first communication interface and said second communication interface; and a computer connected to said computer connection interface;

wherein when said computer connected to said computer connection interface executes an upgrading program, the first operation program stored in said first non-volatile memory and the second operation program stored in said second non-volatile memory are upgraded.

2. A digital mixing system according to claim 1, wherein at least one input unit that inputs input signals from said plurality of input signal systems and at least one output unit that outputs output signals from said plurality of output signal systems are connected to said engine section, and wherein when the computer executes the upgrading program, a third operation program stored in said input unit and a fourth program stored in said output unit are upgraded.

3. A digital mixing system according to claim 1, wherein when said computer executes the upgrading program, versions of the first operation program stored in said first non-volatile memory and the second operation program stored in said second non-volatile memory are determined, it is then determined whether each of the first and second operation programs is to be upgraded, and only at least one of the operation programs that is determined to be upgraded is upgraded.

4. A digital mixing system having a plurality of input signal systems and a plurality of output signal systems, wherein input signals from said plurality of input signal systems are subjected to a mixing process and the mixed signals are output to said plurality of output signal systems, the system comprising:

a console section including panel operating elements used to input parameters relating to the mixing process, a first communication interface, an output device that outputs a mixing control signal at least in response to operation of said panel operating elements, and a first non-volatile memory that stores a first operation program;

an engine section including a mixing processing device that executes the mixing process of mixing input signals from said plurality of input signal systems based on the mixing control signal output from said output device and outputting the mixed signals to said plurality of output signal system, a computer connection interface, a second communication interface, and a second non-volatile memory that stores a second operation program;

communication lines connecting between said first communication interface and said second communication interface; and a computer connected to said computer connection interface;

wherein when said computer connected to said computer connection interface executes an upgrading program, the first operation program stored in said first non-volatile memory and the second operation program stored in said second non-volatile memory are upgraded.

5. A digital mixing system according to claim 4, wherein at least one input unit that inputs input signals from said plurality of input signal systems and at least one output unit that outputs output signals from said plurality of output signal systems are connected to said engine section, and wherein when the computer executes the upgrading program, a third operation program stored in said input unit and a fourth program stored in said output unit are upgraded.

6. A digital mixing system according to claim 4, wherein when said computer executes the upgrading program, versions of the first operation program stored in said first non-volatile memory and the second operation program stored in said second non-volatile memory are determined, it is then determined whether each of the first and second operation programs is to be upgraded, and only at least one of the operation programs that is determined to be upgraded is upgraded.

7. A digital mixing system having a plurality of input signal systems and a plurality of output signal systems, wherein input signals from said plurality of input signal systems are subjected to a mixing process and the mixed signals are output to said plurality of output signal systems, the system comprising:

a console section including panel operating elements used to input parameters relating to the mixing process, and a first control device that provides such control as to output a mixing control signal in response to operation of said panel operating elements;

an engine section connected to said console section and including a mixing processing device that executes the mixing process of mixing the input signals from said plurality of input signal systems and outputting the mixed signals to said plurality of output signal systems, and a second control device that controls the mixing process based on the mixing control signal output from said first control device;

at least one input unit connected to said engine section and including an input device that inputs the input signals from a first external device and outputs the input signals to said engine section, and a third control device that controls said input device based on the mixing control signal input from said console section via said engine section; and at least one output unit connected to said engine section and including an output device that inputs output signals from said engine section and outputs the output signals to a second external device, and a fourth control device that controls said output device based on the mixing control signal input from said console section via said engine section;

wherein a computer is connected to said console section or said engine section, and the computer executes an upgrading program to collectively upgrade a plurality of operation software for controlling respective ones of said first control device of said console section, said second control device of said engine section, said third control device of said input unit, and said fourth control device of said output unit.

8. A digital mixing system according to claim 7, wherein the upgrading program comprises:

a detection step of detecting versions of the operation software for controlling respective ones of said first control device of said console section, said second control device of said engine section, said third control device of said input unit, and said fourth control device of said output unit;

a comparison step of comparing versions of upgrading software constituting the upgrading program and for upgrading the operation software for said first to fourth control devices with the detected versions of the operation software for said first to fourth control devices;

a transmission step of transmitting the upgrading software to at least one of said first to fourth control devices for which it is determined in said comparison step that a corresponding one of the upgrading software is newer than a corresponding one of the operation software; and an upgrading step of upgrading the operation software for the at least one of said first to fourth control devices to which the upgrading software has been transmitted, using the transmitted upgrading software.

* * * * *